United States Patent
Stabile et al.

(10) Patent No.: US 9,432,215 B2
(45) Date of Patent: Aug. 30, 2016

(54) HIERARCHICAL NETWORK MANAGERS

(71) Applicant: VMware, Inc., Palo Alto, CA (US)

(72) Inventors: James Joseph Stabile, Los Altos, CA (US); Debashis Basak, San Jose, CA (US); Amol Palshikar, Pune (IN); Sachin Thakkar, San Jose, CA (US)

(73) Assignee: NICIRA, INC., Palo Alto, CA (US)

( * ) Notice: Subject to any disclaimer, the term of this patent is extended or adjusted under 35 U.S.C. 154(b) by 391 days.

(21) Appl. No.: 13/899,549

(22) Filed: May 21, 2013

(65) Prior Publication Data
US 2014/0351396 A1    Nov. 27, 2014

(51) Int. Cl.
*G06F 15/173* (2006.01)
*H04L 12/58* (2006.01)
*H04L 12/24* (2006.01)
*G06F 9/455* (2006.01)
*H04L 29/08* (2006.01)
*H04L 12/26* (2006.01)

(52) U.S. Cl.
CPC ......... *H04L 12/581* (2013.01); *G06F 9/45558* (2013.01); *H04L 29/08* (2013.01); *H04L 41/044* (2013.01); *H04L 43/0817* (2013.01); *H04L 43/10* (2013.01)

(58) Field of Classification Search
USPC .............. 709/223, 217; 726/11, 22; 714/712
See application file for complete search history.

(56) References Cited

U.S. PATENT DOCUMENTS

| | | |
|---|---|---|
| 5,224,100 A | 6/1993 | Lee et al. |
| 5,504,921 A | 4/1996 | Dev et al. |
| 5,550,816 A | 8/1996 | Hardwick et al. |
| 5,729,685 A | 3/1998 | Chatwani et al. |
| 5,751,967 A | 5/1998 | Raab et al. |
| 5,796,936 A | 8/1998 | Watabe et al. |
| 6,104,699 A | 8/2000 | Holender et al. |
| 6,219,699 B1 | 4/2001 | McCloghrie et al. |
| 6,512,745 B1 | 1/2003 | Abe et al. |
| 6,539,432 B1 | 3/2003 | Taguchi et al. |

(Continued)

FOREIGN PATENT DOCUMENTS

WO    WO 2013/184846    12/2013

OTHER PUBLICATIONS

Author Unknown,"Apache Cassandra™ 1.2 Documentation," Jan. 13, 2013, 201 pages, DataStax.

(Continued)

*Primary Examiner* — Kyung H Shin
(74) *Attorney, Agent, or Firm* — Adeli LLP

(57) ABSTRACT

Some embodiments provide a network system that includes several host machines for hosting virtual machines, divided into several different domains. The network system includes several local domain management servers. A first local domain management server of a first domain is for (i) initiating creation of a set of distributed virtual switch ports associated with a particular logical network identifier on a host machine within its domain and (ii) attaching a first virtual machine on the host machine to a created port associated with the particular logical network identifier in order for the first virtual machine to send traffic over the logical network. The network system includes a second level management server for coordinating the use of logical network identifiers between multiple different logical domain management servers in order for the first virtual machine to communicate via the logical network with a second virtual machine in a second domain.

20 Claims, 16 Drawing Sheets

(56) References Cited

U.S. PATENT DOCUMENTS

| | | |
|---|---|---|
| 6,680,934 B1 | 1/2004 | Cain |
| 6,785,843 B1 | 8/2004 | McRae et al. |
| 6,804,263 B1 | 10/2004 | Okawa |
| 6,862,263 B1 | 3/2005 | Simmons |
| 6,934,252 B2 | 8/2005 | Mehrotra et al. |
| 6,941,487 B1 | 9/2005 | Balakrishnan et al. |
| 6,963,585 B1 | 11/2005 | Le Pennec et al. |
| 7,079,544 B2 | 7/2006 | Wakayama et al. |
| 7,096,228 B2 | 8/2006 | Theimer et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,263,290 B2 | 8/2007 | Fortin et al. |
| 7,286,490 B2 | 10/2007 | Saleh et al. |
| 7,359,971 B2 | 4/2008 | Jorgensen |
| 7,450,598 B2 | 11/2008 | Chen et al. |
| 7,483,370 B1 | 1/2009 | Dayal et al. |
| 7,606,260 B2 | 10/2009 | Oguchi et al. |
| 7,649,851 B2 | 1/2010 | Takashige et al. |
| 7,710,874 B2 | 5/2010 | Balakrishnan et al. |
| 7,730,486 B2 | 6/2010 | Herington |
| 7,792,987 B1 | 9/2010 | Vohra et al. |
| 7,818,452 B2 | 10/2010 | Matthews et al. |
| 7,826,482 B1 | 11/2010 | Minei et al. |
| 7,885,276 B1 | 2/2011 | Lin |
| 7,899,027 B2 | 3/2011 | Castagnoli et al. |
| 7,937,438 B1 | 5/2011 | Miller et al. |
| 7,948,986 B1 | 5/2011 | Ghosh et al. |
| 8,027,354 B1 | 9/2011 | Portolani et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,166,201 B2 | 4/2012 | Richardson et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,312,129 B1 | 11/2012 | Miller et al. |
| 8,456,984 B2 | 6/2013 | Ranganathan et al. |
| 8,504,718 B2 | 8/2013 | Wang et al. |
| 8,621,058 B2 | 12/2013 | Eswaran et al. |
| 8,644,188 B1 | 2/2014 | Brandwine et al. |
| 8,705,513 B2 | 4/2014 | Van Der Merwe et al. |
| 8,707,417 B1 * | 4/2014 | Liang .................. G06F 9/45558 726/11 |
| 8,830,835 B2 | 9/2014 | Casado et al. |
| 8,964,767 B2 | 2/2015 | Koponen et al. |
| 2003/0093481 A1 | 5/2003 | Mitchell et al. |
| 2004/0047286 A1 | 3/2004 | Larsen et al. |
| 2004/0073659 A1 | 4/2004 | Rajsic et al. |
| 2004/0098505 A1 | 5/2004 | Clemmensen |
| 2004/0267897 A1 | 12/2004 | Hill et al. |
| 2005/0018669 A1 | 1/2005 | Arndt et al. |
| 2005/0038834 A1 | 2/2005 | Souder et al. |
| 2005/0083953 A1 | 4/2005 | May |
| 2005/0120160 A1 | 6/2005 | Plouffe et al. |
| 2006/0002370 A1 | 1/2006 | Rabie et al. |
| 2006/0026225 A1 | 2/2006 | Canali et al. |
| 2006/0092940 A1 | 5/2006 | Ansari et al. |
| 2006/0092976 A1 | 5/2006 | Lakshman et al. |
| 2006/0174087 A1 | 8/2006 | Hashimoto et al. |
| 2006/0184937 A1 | 8/2006 | Abels et al. |
| 2006/0193266 A1 | 8/2006 | Siddha et al. |
| 2007/0043860 A1 | 2/2007 | Pabari |
| 2007/0156919 A1 | 7/2007 | Potti et al. |
| 2007/0220358 A1 | 9/2007 | Goodill et al. |
| 2007/0260721 A1 | 11/2007 | Bose et al. |
| 2007/0283348 A1 | 12/2007 | White |
| 2007/0297428 A1 | 12/2007 | Bose et al. |
| 2008/0002579 A1 | 1/2008 | Lindholm et al. |
| 2008/0040467 A1 | 2/2008 | Mendiratta et al. |
| 2008/0049621 A1 | 2/2008 | McGuire et al. |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0133729 A1 * | 6/2008 | Fridman ............... H04L 12/581 709/223 |
| 2008/0159301 A1 | 7/2008 | de Heer |
| 2008/0165704 A1 | 7/2008 | Marchetti et al. |
| 2009/0296726 A1 | 12/2009 | Snively et al. |
| 2010/0125667 A1 | 5/2010 | Soundararajan |
| 2011/0103259 A1 | 5/2011 | Aybay et al. |
| 2011/0296052 A1 | 12/2011 | Guo et al. |
| 2011/0299413 A1 | 12/2011 | Chatwani et al. |
| 2011/0320821 A1 | 12/2011 | Alkhatib et al. |
| 2012/0147894 A1 | 6/2012 | Mulligan et al. |
| 2013/0024579 A1 | 1/2013 | Zhang et al. |
| 2013/0044641 A1 | 2/2013 | Koponen et al. |
| 2013/0044751 A1 | 2/2013 | Casado et al. |
| 2013/0044752 A1 | 2/2013 | Koponen et al. |
| 2013/0044761 A1 | 2/2013 | Koponen et al. |
| 2013/0044762 A1 | 2/2013 | Casado et al. |
| 2013/0142203 A1 | 6/2013 | Koponen et al. |
| 2013/0254328 A1 * | 9/2013 | Inoue .................... H04L 29/08 709/217 |
| 2013/0332602 A1 | 12/2013 | Nakil et al. |
| 2013/0332619 A1 | 12/2013 | Xie et al. |
| 2014/0136908 A1 * | 5/2014 | Maggiari ............. H04L 12/462 714/712 |

OTHER PUBLICATIONS

Author Unknown, "Virtual Machine Backup Guide," Nov. 2007, pp. 1-78, VMware, Inc., Palo Alto, California.

* cited by examiner

HIERARCHICAL NETWORK MANAGERS

BACKGROUND

A hosting system architecture may have various constraints on how virtual machines within the hosting system can be linked together in a network. For instance, some technologies impose a limit on the number of machines that can communicate over a single virtual network, or the number of virtual networks possible on a single physical network. VLAN technology, for example, can only have 4,094 different virtual networks on a single network. With the growing prevalence of data center usage, this is too small a number on its own. As a result, various technologies have appeared to augment or replace the standard VLAN tagging within a multi-tenant hosting system.

Furthermore, the technologies in some hosting systems may restrict the number of machines that can communicate with each other over one virtual network. For example, a data center might be divided into numerous separate "pods", each separately managed. However, with larger and larger networks required, a tenant may need a network that covers multiple pods. Without coordination between the pods, setting up a virtual network with machines in both pods will be difficult.

BRIEF SUMMARY

Some embodiments provide a network management system for a hosting system that includes local domain management servers at each of several domains within the hosting system and a second level management server for coordinating creation and maintenance of logical networks by the local domain management servers. The hosting system, in some embodiments, includes numerous host machines divided into several domains, each of which has a local domain management server. When the second level management server receives a specification of a logical network that spans one or more domains, the second level server allocates a network identifier for the specified logical network and sends instructions to create the logical network to the local domain servers for the domains spanned by the logical network. The local domain servers then create the logical network by configuring host machines within their domains, enabling host machines located in different domains to communicate with each other via a single logical network.

In some embodiments, the second level management server receives the specification of the logical network as input from a user that specifies a plurality of virtual machines to connect to the logical network and one or more domains over which the logical network spans (i.e., the domains in which the specified virtual machines are located). The second level management server stores a set of available logical network identifiers, and selects one of the available identifiers for the specified logical network. The second level management server then sends instructions to the local domain servers to create the logical network. These instructions, in some embodiments, include the virtual machines within the domain to attach to the logical network along with the logical network identifier selected by the second level management server. In some embodiments, the second level management server is one of a cluster of such servers that acts as a single machine. The second level management servers in the cluster store logical network state information in a database or other storage structure that is synchronously replicated to the other servers when updated.

A local domain manager receives the instructions from the second level management server and configures the identified virtual machines within its domain in order for the virtual machines to send traffic over the logical network. In some embodiments, the host machines include distributed virtual switches. These distributed virtual switches enable multiple different virtual machines on a single host machine to connect to different logical networks, while also enabling multiple virtual machines on different host machines to connect to a single logical network. Virtual machines connected to the same logical network can exchange traffic packets in isolation from other machines not connected to the logical network.

In order to configure a virtual machine operating on a host machine to connect to a logical network, the local domain manager of some embodiments first creates a set of ports for the logical network on the host machine. That is, the local domain manager sends instructions to the distributed virtual switch to create the set of ports and associate the ports with the identifier for the logical network. The local domain manager then sends instructions to the virtual machine (or a virtual machine monitor of the host machine) to connect to one of the newly created ports of the distributed virtual switch. When the virtual machine sends a traffic packet to the port, the distributed virtual switch adds the logical network identifier to the packet (among other processing operations) before sending the packet out over a physical network connecting the hosts in the hosting system.

The network management system performs ongoing management of the logical network after its creation. For instance, the second level management server regularly performs status polling to monitor the state of the logical network. In some embodiments, the second level management server uses the logical network identifier to query each of the local domain managers that manage virtual machines within the logical network. These local domain managers query the host machines at which the virtual machines are located in order to receive connectivity and state information. The local domain managers then aggregate the information received from their host machines before sending the aggregated information to the second level management server. The second level management server, in turn, aggregates the received information and analyzes the logical network.

In addition, the second level management server enables various updates to the logical network. Users can specify to add or remove virtual machines within a domain currently spanned by the logical network. In some embodiments, when a virtual machine is removed from a logical network, the local domain manager only removes the connection of the virtual machine to a port associated with the logical network, but does not remove the ports from the host machine. Users can also specify to add or remove domains from the span of a logical network. In order to remove a domain from the logical network span, some embodiments remove all ports associated with the logical network from all host machines within the domain.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed.

Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a network management system for a hosting system that includes local domain management servers at each of several domains within the hosting system and a second level management server for coordinating creation and maintenance of logical networks by the local domain management servers. The hosting system, in some embodiments, includes numerous host machines divided into several domains, each of which has a local domain management server. When the second level management server receives a specification of a logical network that spans one or more domains, the second level server allocates a network identifier for the specified logical network and sends instructions to create the logical network to the local domain servers for the domains spanned by the logical network. The local domain servers then create the logical network by configuring host machines within their domains, enabling host machines located in different domains to communicate with each other via a single logical network.

Figure 1:
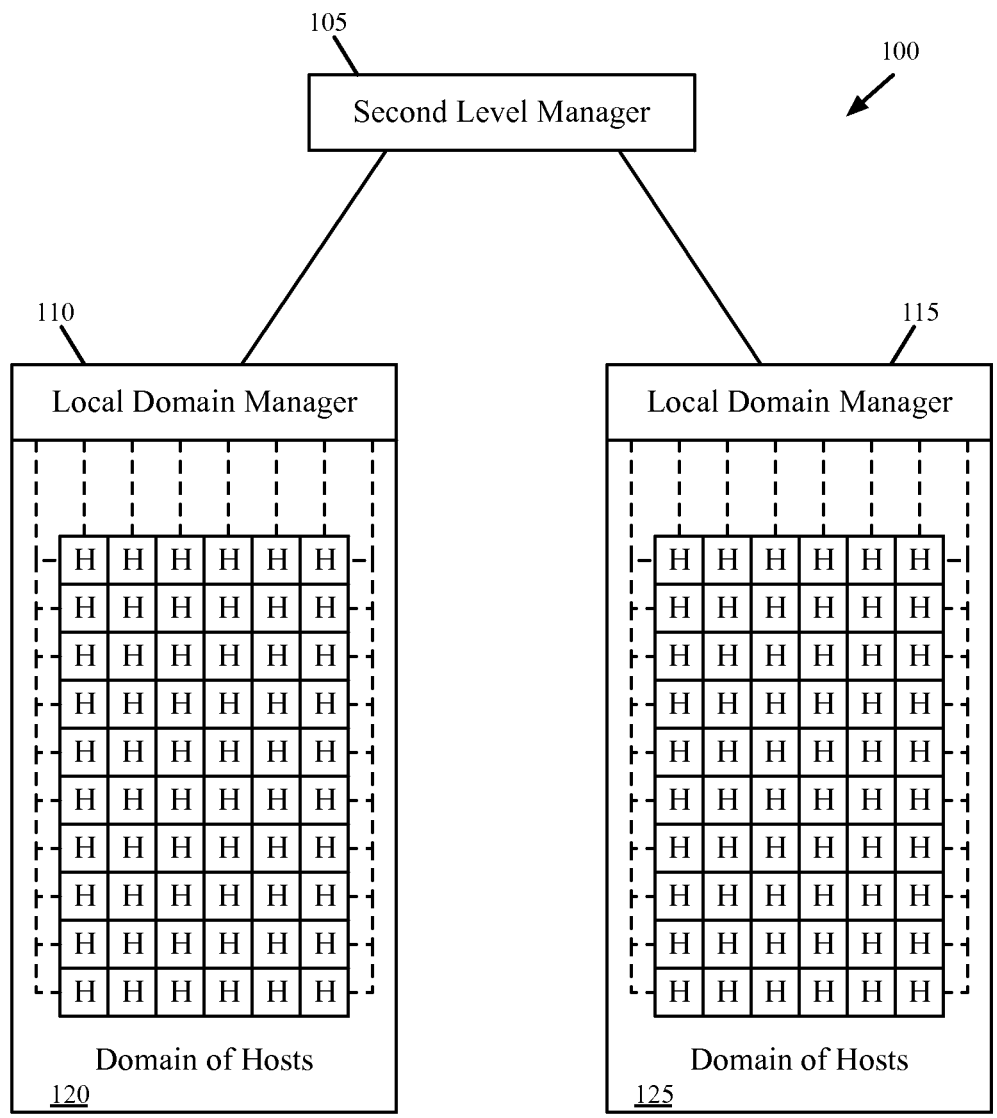
FIG. 1 conceptually illustrates a simplified view of a network management system of some embodiments.

FIG. 1 conceptually illustrates a simplified view of such a network management system 100 of some embodiments. As shown, the network management system 100 includes a second level manager 105 and two local domain managers 110 and 115 that each manage a different domain of hosts. The local domain manager 110 is responsible for managing the hosts within domain 120 the local domain manager 115 is responsible for managing the hosts within domain 125. In some embodiments, this entails both managing the virtual machine (VM) creation and configuration by communicating with hypervisors on the hosts that provide virtual hardware resources to the VMs as well as managing the networking functions of the host machines by communicating with distributed virtual switches (e.g., software switches) that operate on the host machines.

In some embodiments, each of the host machines shown in the figure contains a virtual machine monitor, or hypervisor, on which one or more VMs operate. In addition, each of the host machines contains one or more distributed virtual switches within which numerous ports may be created. Virtual network interface cards (VNICs) of the VMs are configured to connect to particular ports of a distributed virtual switch in order to send packets to and receive packets from other VMs within the hosting system or machines external to the hosting system. The local domain managers 110 and 115 of some embodiments communicate with the hypervisors and distributed virtual switches on their hosts in order to manage these functions (e.g., VM creation, port creation, attachment of a VM to a port, etc.). In some embodiments, a local domain manager as shown in FIG. 1 actually includes two separate management servers, a first server for managing the creation and configuration of VMs operating on the hypervisors of the hosts, and a second server for managing the creation and configuration of the distributed virtual switches operating on the hosts.

The second level management server 105 coordinates the creation and ongoing management (e.g., monitoring, updating) of logical networks that span multiple domains (e.g., with VMs in both of the domains 120 and 125 connected to the logical network). This enables a VM located on a host in the first domain 120 to communicate (i.e., exchange traffic packets) with a VM located on a host in the second domain 125. While this example illustrates only two domains of hosts, in many cases a data center will have numerous (e.g., dozens, hundreds, etc.) of different domains, each managed by a local domain manager, with one second level manager controlling the local domain managers at the different domains.

Figure 2:
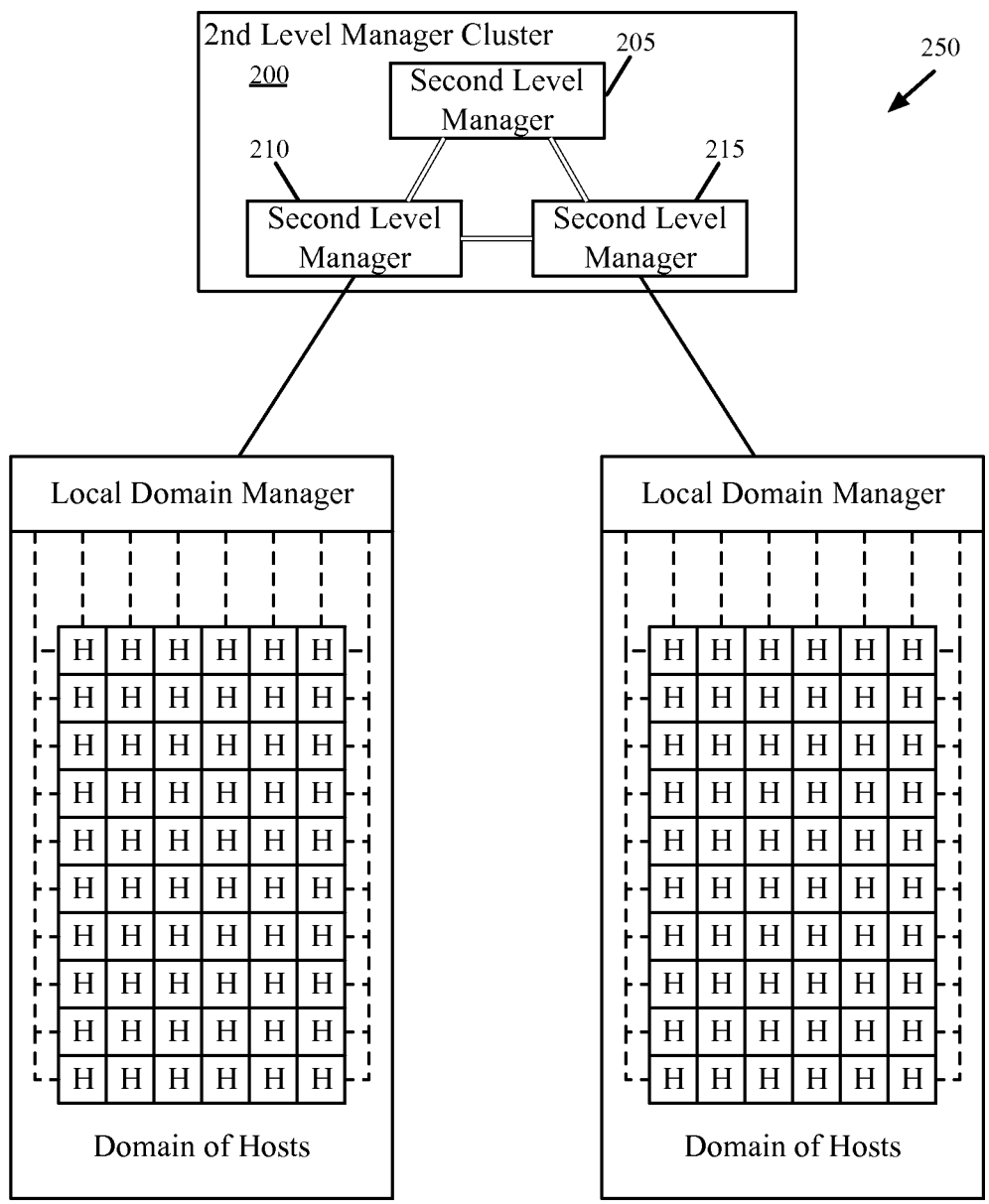
FIG. 2 conceptually illustrates a network management system in which the second level manager is a cluster of three separate second level management servers.

In some embodiments, the second level management server 105 is actually a cluster of servers that operates as a single entity. FIG. 2 conceptually illustrates such a network management system 250 in which the second level manager 200 is a cluster of three separate second level management servers 205-215. The second level management servers 205-215 function as a single distributed server in some embodiments, and the local domain managers 220 and 225 view the second level manager cluster 200 as a single entity. In some such embodiments, each of the second level managers 205-215 stores logical network information in a database or other storage. In some embodiments this database or other storage is synchronously replicated to the other members of the cluster when updated, while other embodiments user asynchronous replication.

While these figures illustrate the second level managers as separate from the local domain managers, in some embodiments the second level managers may be deployed in the same physical machine (i.e., on the same physical server). As one example, each local domain manager might operate on a separate machine, with each machine also hosting one of the second level managers in the second level manager cluster. Another example places one of the second level managers in a cluster in the same machine as one of the local domain managers, while the other managers in the cluster are in separate machines that do not run a local domain manager. In other embodiments, the second level managers and local domain managers are physically separate.

Figure 3:
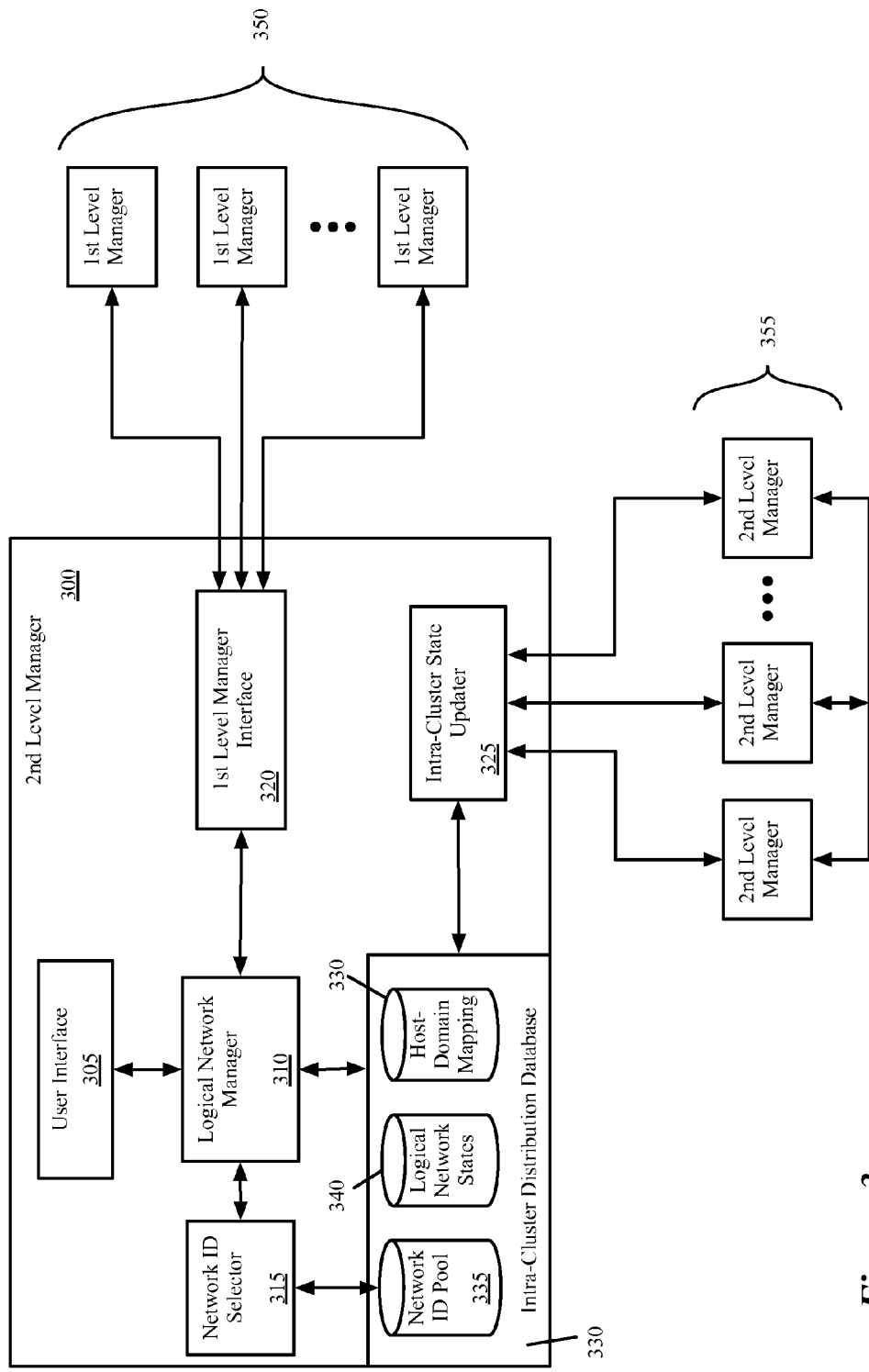
FIG. 3 conceptually illustrates the architecture of a second level management server of some embodiments.

FIG. 3 conceptually illustrates the architecture of a second level management server 300 of some embodiments (e.g., one of the servers 205-215). As shown, the second level management server 300 includes a user interface 305, a logical network manager 310, a network identifier selector 315, a first-level manager interface 320, and an intra-cluster state updater 325.

In addition, the second level management server 300, one of several such servers operating as a cluster, includes an intra-cluster distribution database 330 storing a network identifier pool 335, logical network states 340, and host-domain mapping 345. The network identifier pool 335 stores a range of unallocated network identifiers; that is, identifiers that have not yet been assigned to a logical network present in the hosting system. The logical network states 340 stores information about existing logical networks. This information includes, for a logical network, the VMs connected to the logical network (and, in some embodiments, the host on which the VMs operate), the network identifier assigned to the logical network, status information for the VMs and the network as a whole, and the domains over which the logical network spans. The host-domain mapping 345 of some embodiments identifies, for each host, the domain in which the host is located.

The user interface 305 receives the initial specification of a logical network as input from a user, as well as user-specified updates to the logical network. In some embodiments, this specification for a logical network specifies a plurality of virtual machines to connect to the logical network and one or more domains over which the logical network spans (i.e., the domains in which the specified virtual machines should be created if not currently located in the specified domains). In some embodiments, a user accesses the user interface 305 of the second level management server 300 from a remote location via a network, while in other embodiments the user interacts directly with the physical machine on which the second level management server runs. The user interface 305 may be a graphical interface, a command line interface, etc.

In some embodiments, the second level management server 300 exposes an API to the user through the user interface 305. That is, the user views and interacts with the user interface 305, which translates the user's actions into API commands that instruct the second level management server 300. Just as the cluster of second level management servers appear to the local domain managers as a single entity, the cluster also appears as a single entity from the point of view of a user interacting with the exposed API, in some embodiments.

The logical network manager 310 of some embodiments is responsible for translating the specifications received via the user interface 305 into actions to be taken by the network management system. The logical network manager 310 utilizes the network identifier selector 315 to assign a network identifier to a newly-specified logical network. The network identifier selector 315 accesses the network identification pool 335 to select one of the available network IDs for a new logical network. Different embodiments select the identifier for a network differently. For example, some embodiments select a random available identifier, while other embodiments select the next identifier in a particular order. The network identifier selector 315 selects an identifier and returns the selected identifier to the logical network manager 310.

The logical network manager 310 associates a selected identifier with a newly-specified logical network, and stores this assignment in the logical network state information 340. The logical network manager 310 stores other updates to the intra-cluster distribution database 330 as well, specifically to the logical network state information. For instance, the logical network manager 310 initiates status polling of the host machines to retrieve connectivity and state information about the logical networks, and stores this collected information in the database 330. In addition, when updates to a logical network are received through the user interface 305, the logical network manager 310 updates the intra-cluster distribution database 330.

The intra-cluster state updater 325 identifies when the intra-cluster distribution database 330 has been updated, and replicates these updates to the other second-level managers 355. In some embodiments, this is an automatic synchronous replication of the database. The distribution database 330, of some embodiments, is a peer-to-peer database with transaction capabilities at commit time (e.g., GemFire). Thus, in some embodiments, the intra-cluster state updater 325 is actually a part of the database 330 itself. That is, the database 330 identifies changes and automatically propagates these changes itself to the corresponding databases on the other second level management servers 355. The second level management servers 355 each communicate with each other to maintain updated databases, so that any of the management servers 355 can communicate with the first level managers 350.

The use of such a cluster of second level manager nodes allows for high availability, scalability, and fault tolerance. If any one of the second level managers 350 fails during the logical network processing (e.g., creation, updating, etc. of a logical network), then one of the other second level managers 350 is able to continue the processing where the first left off, thereby providing resiliency to the management system.

In addition to updating the database 330, the logical network manager 310 uses the first level manager interface 320 to communicate with the first level managers 350 (e.g., the local domain managers 220 and 225). Through this interface, the second level management server 300 sends instructions to the first level managers 350 to create or modify a specified logical network. The instructions to create a network, in some embodiments, include the virtual machines within the domain to attach to the logical network along with the logical network identifier selected by the second level management server.

A first level manager 350 receives the instructions for creating a logical network from the second level management server 300 and configures the identified virtual machines within its domain in order for the virtual machines to send traffic over the logical network. In some embodiments, the host machines include distributed virtual switches. These distributed virtual switches enable multiple different virtual machines on a single host machine to connect to different logical networks, while also enabling multiple virtual machines on different host machines to connect to a single logical network. Virtual machines connected to the same logical network can exchange traffic packets in isolation from other machines not connected to the logical network.

In order to configure a virtual machine operating on a host machine to connect to a logical network, the first level manager 350 of some embodiments first creates a set of ports for the logical network on the host machine. That is, the first level manager 350 sends instructions to a distributed virtual switch on the host machine to create the set of ports and associate the ports with the identifier for the logical network. The first level manager 350 then sends instructions to the virtual machine (or a virtual machine monitor of the host machine) to connect to one of the newly created ports of the distributed virtual switch. When the virtual machine sends a traffic packet to the port, the distributed virtual switch adds the logical network identifier to the packet (among other processing operations) before sending the packet out over a physical network connecting the hosts in the hosting system.

The network management system performs ongoing management of the logical network after its creation. For instance, the second level management server 300 regularly performs status polling to monitor the state of the logical network. In some embodiments, the logical network manager 310 uses the logical network identifier for a logical network to query, through the first level manager interface 320, each of the first level managers 350 that manage virtual machines within the logical network. The first level managers 350 then query the host machines at which the virtual machines are located in order to receive connectivity and state information. The first level managers 350 then aggregate the information received from their host machines before sending the aggregated information to the second level management server 300. The logical network manager 310 aggregates the received information and analyzes the logical network, in addition to updating the database 330 so that the aggregated information can be distributed to the other second level management servers 355. In some embodiments, different second level management servers 355 receive status updates from different first level managers 350, and use their replicated databases to share this information for analysis.

In addition, the second level management server 300 enables various updates to the logical networks. Users can specify through the user interface 305 to add or remove virtual machines within a domain currently spanned by a logical network. In some embodiments, when a virtual machine is removed from a logical network, the first level manager 350 only removes the connection of the virtual machine to a port associated with the logical network, but does not remove the ports from the host machine. Users can also specify to add or remove domains from the span of a logical network. In order to remove a domain from the logical network span, some embodiments remove all ports associated with the logical network from all host machines within the domain.

The above description introduces the hierarchical network management system of some embodiments. Several more detailed embodiments are described below. First, Section I describes in further detail the creation of a logical network in the system of some embodiments, while Section II describes the communication between VMs within a logical network according to some embodiments. Next, Section III describes the operations of the hierarchical network managers in managing a logical network, such as status polling, updates to the network, and deletion of a network. Finally, Section IV describes an electronic system with which some embodiments of the invention are implemented.

I. Creation of a Logical Network

As indicated above, the hierarchical network management system of some embodiments enables the creation of a logical network within a hosting system that spans multiple domains that are each managed by separate management servers. Whereas the separate local domain managers would not have a way to coordinate the use of logical network identifiers between domains, the second level management servers enable such coordination by handling the assignment of network identifiers, aggregating network state information, and managing updates that affect multiple domains.

Figure 4:
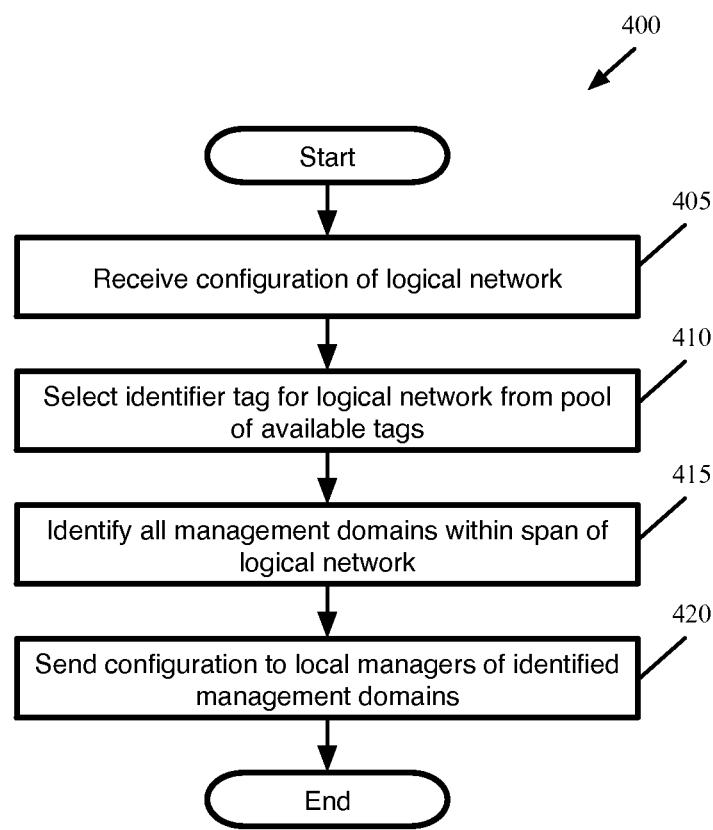
FIG. 4 conceptually illustrates a process for creating a logical network that spans multiple domains within the hosting system of some embodiments.

FIG. 4 conceptually illustrates a process 400 for creating a logical network that spans multiple domains within the hosting system of some embodiments. The process 400 is performed by a second level manager (e.g., a single server or a cluster operating as a single entity) in some embodiments. The process will be described in part by reference to FIG. 5, which conceptually illustrates the initiation of a logical network on multiple hosts throughout several domains of a hosting system 500 over three stages 510-530. The hosting system 500 includes a second level manager 505 and three local domain managers 515, 525, and 535, each managing a different domain of hosts.

In some embodiments, the local domain managers 515-535 each actually include two components, which may be provided as separate physical machine, separate entities within a single physical machine, or several modules within a single application. In such embodiments, a first local hypervisor manager handles communication with hypervisors on the hosts in order to create and manage virtual machines (i.e., virtual machine creation, configuration, migration, etc.). A second local networking manager of some embodiments handles communication with distributed virtual switches on the hosts in order to manage the logical networks within the hosting system. The local networking manager instructs a distributed virtual switch on a particular host to create a port group (i.e., a set of ports) associated with a particular logical network identifier. In some embodiments, the local hypervisor manager creates the connection of a VM to one of these ports in the distributed virtual switch, while in other embodiments the local networking manager oversees the creation of the VM connection. In addition, in some embodiments the local hypervisor manager stores the addresses of all of the hypervisors for communication, and provides these as needed to the local networking manager.

As shown, the process 400 begins (at 405) by receiving a configuration of a logical network. In some embodiments, the second level manager receives this configuration from a user (e.g., a network administrator) through a user interface (e.g., the interface 305 of FIG. 3). This user interface may be presented graphically to a user, through a command line interface, etc. In some embodiments, the user enters the information locally at the second level management server, while in other embodiments the user logs in remotely to the server to specify a logical network. The user specifies a set of virtual machines to be connected within a single network. In addition, the user can specify the number of domains across which these virtual machines may span. In some embodiments, the user also specifies particular domains within the hosting system across which the logical network will span (e.g., domains 3, 7, and 15). That is, the user can determine the span of their logical network.

Figure 5:
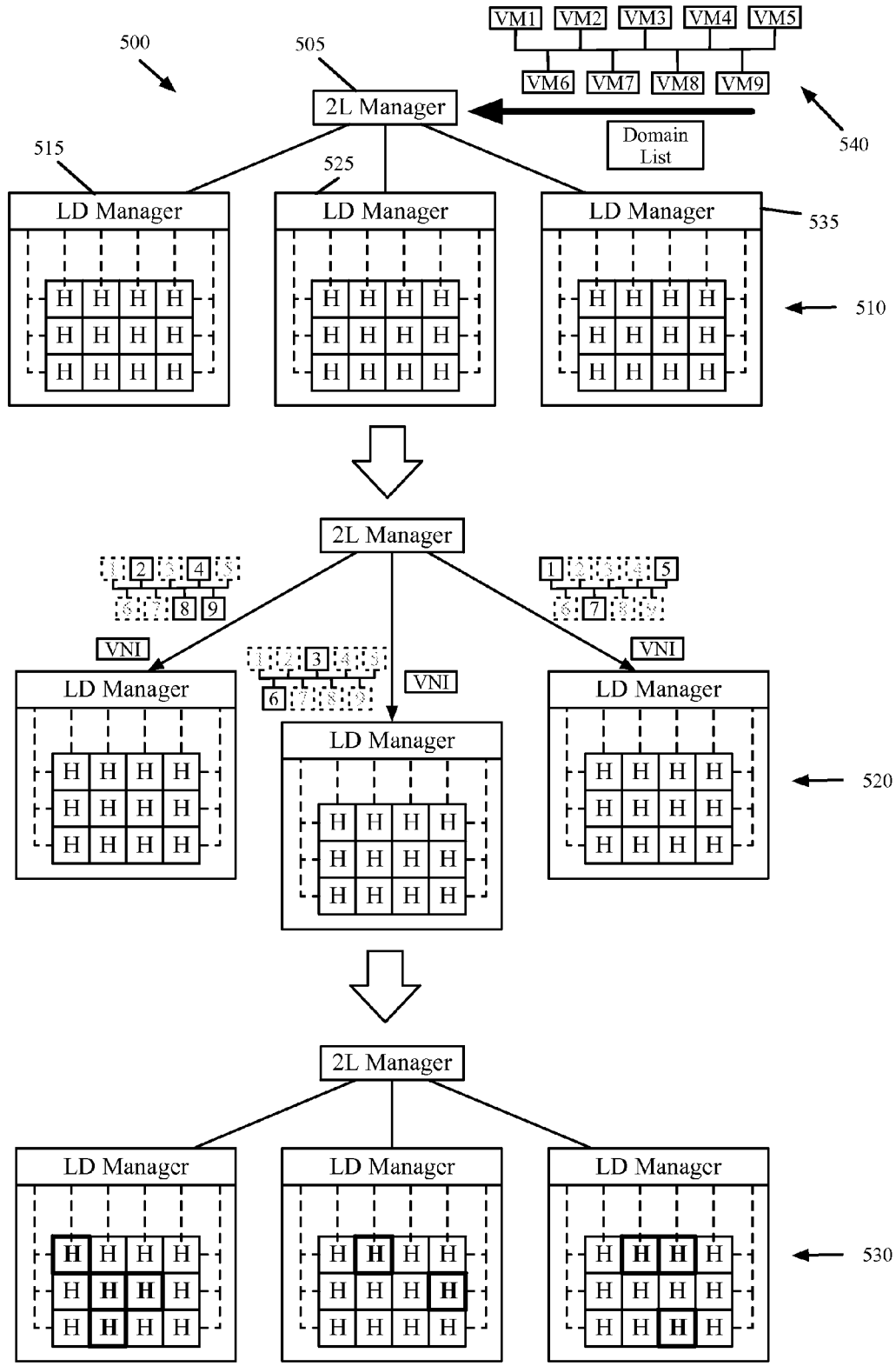
FIG. 5 conceptually illustrates the initiation of a logical network on multiple hosts throughout several domains of a hosting system.

The first stage 510 of FIG. 5 illustrates the second level manager 505 receiving a logical network specification 540. The logical network 540 connects nine virtual machines. In this case, each VM will be able to communicate directly with each other VM (in the logical space), even though the physical connections between two VMs may involve numerous physical switches, routers, etc. In addition to the logical network of nine VMs, the specification also includes a list of domains for the network to span (i.e., a list of domains in which the VMs may be located. In this case, the allowed domains are the three domains managed by the local domain managers 515-535.

Returning to FIG. 4, the process 400 selects (at 410) an identifier tag for the logical network from a pool of available tags. In some embodiments, the second level manager stores this pool of available tags in a database replicated between the management servers. The tags may consist of numbers within a particular range (e.g., using a specific number of bits). The network ID pool 335 of FIG. 3 is an example of such a pool of available tags. When the tag is selected, the second level manager removes the selected tag from the pool so that it will not be assigned to multiple different logical networks.

Next, the process identifies (at 415) all management domains within the span of the logical network. As shown in the first stage 510 of FIG. 5, this information is provided by the user as part of the specification of the logical network in some embodiments. In other embodiments, the second level manager determines the domains over which the logical network spans. For instance, in some cases, the VMs specified for the logical network may already have been created within the hosting system. In this case, the second level manager identifies the domains in which these VMs are located as the span of the logical network. In other cases, however, the VMs are not yet created, and the second level manager identifies locations for the VMs in order to determine the span of the logical network.

Finally, the process 400 sends (at 420) the logical network configuration to the local managers of the identified management domains. The process then ends at the second level management server. The second stage 520 of FIG. 5 illustrates the second level manager 505 sending information to the three local domain managers 515-535. As shown, rather than sending the entire configuration information to each of the local domain managers, different information specific to the manager's particular domain is sent to each particular manager. The first local domain manager 515 receives information for VMs 2, 4, 8, and 9 because these are the VMs hosted (or to be hosted) within its domain. Similarly, the second local domain manager 525 receives information for VMs 3 and 6, and the third local domain manager 535 receives information for VMs 1, 5, and 7.

In some embodiments, the information sent about the VMs by the second level manager is simply a list of existing VMs. The VMs may be identified according to a format specified by an API of the local domain manager. In other embodiments, the second level manager sends more detailed information through the local domain manager API specifying configuration information for the VMs so that the local domain manager can create the VMs within its domain. In some embodiments, the second level manager communicates with the networking manager portion of the local domain manager, which in turn passes the information to its corresponding hypervisor manager.

In addition to the VM information, the second level manager sends the selected network identifier tag to each of the local domain managers. This is shown as a VNI, or VXLAN Network Identifier, in FIG. 5 (as well as later figures), though one of ordinary skill in the art will recognize that the logical network identifiers are not restricted to any particular type of identifier. Because the second level manager selects and transmits the logical network identifier, all of the identifiers for a particular network will be the same across the different domains, without requiring a user to manually input a particular identifier to numerous different local domain managers.

The third stage 530 of FIG. 5 illustrates that the local domain managers 515-535 have set up the logical network on their respective hosts. The hosts on which the logical network ports have been created are shown in bold. In this case, each of the virtual machines in the logical network is created on a different host, and therefore there are nine hosts on which the logical network has been created.

Figure 6:
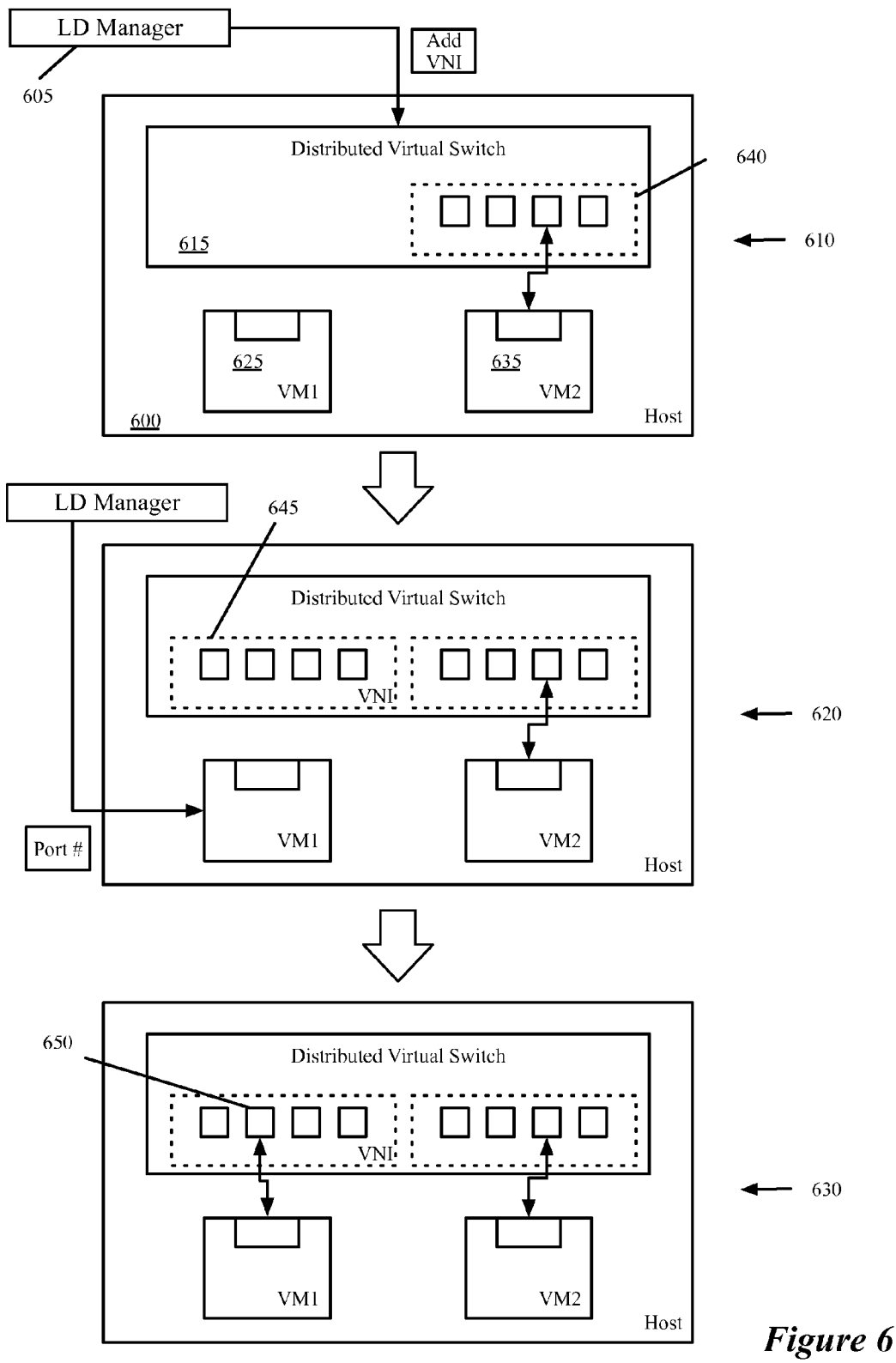
FIG. 6 conceptually illustrates the creation of a logical network on a specific host by a local domain manager.

While the third stage 530 of FIG. 5 simply illustrates that the local domain managers create the logical network on their respective hosts, FIG. 6 conceptually illustrates in more detail the creation of a logical network on a specific host 600 by a local domain manager 605 (e.g., one of local domain managers 515-535) over three stages 610-630. The host 600 houses at least one distributed virtual switch 615 as well as two virtual machines 625 and 635. For simplicity, this figure does not show a hypervisor or other functions within the host that support the existence of the virtual machine (e.g., by virtualizing hardware resources of the physical host). However, one of ordinary skill in the art will recognize that additional software modules beyond those shown in the figure may run on the host machine.

The distributed virtual switch 615 of some embodiments is a software forwarding element that allows the virtualization of forwarding (e.g., L2 switching, L3 routing, access control, etc.) functions. The distributed virtual switch 615 enables the creation of different ports associated with different logical networks, which maintain isolation from each other. Furthermore, the distributed virtual switch of some embodiments stores forwarding tables (not shown) enabling the forwarding of packets from and to the various local virtual machines. Within the distributed virtual switch 605 is a set of ports 640 for a first, already-existing logical network. The VM 635 attaches to one of these ports through its virtual network interface card (VNIC) in order to connect to this existing logical network. Each of the ports 640 is associated with a logical network identifier for the existing logical network; when the VM 635 sends a packet through the port, the distributed virtual switch of some embodiments adds the logical network identifier to the packet.

In the first stage 610, the local domain manager 605 sends an add port group command to the distributed virtual switch 615. This command includes a logical network identifier to associate with the ports in the newly created port group. This logical network identifier sent by the logical domain manager is the same identifier received from the second level manager in some embodiments. In the second stage 620, the distributed virtual switch 615 creates a new set of ports 645, associated with the received logical network identifier. While both sets of ports are shown as having four ports associated with their particular logical network, one of ordinary skill in the art will recognize that any number of ports may be created for a particular port group. In some embodiments, the local domain manager specifies a number of ports for a particular logical network, while in other embodiments the distributed virtual switch creates a default number of ports.

In addition, the second stage 620 illustrates that the local domain manager sends a command with a port number to the virtual machine 625. This command, in various embodiments, may be sent to the VM through a hypervisor, virtual machine monitor, or other application running on the host to enable communication with the VM. The command indicates to the VM a particular port of the local distributed virtual switch 615 with which to connect. In some embodiments, after generating the port group 645, the distributed virtual switch 615 sends the port information up to the local domain manager 605. The local domain manager 605 can then use this information to set up VM connections within the host 600.

The third stage 630 illustrates that the VM 625 is now connected to a particular one of the ports 650 of the port group 645. Thus, when the VM 625 needs to send a packet to another VM within its logical network, the VM sends the packet to the particular port 650 of the distributed virtual switch 615. The distributed virtual switch, recognizing that the packet is received from the port 650, adds the logical network tag associated with the port (the VNI received from the local domain manager in the first stage 610) to the packet, and sends the packet out over the physical network of the hosting system.

In some embodiments, rather than tailoring the creation of a logical network (i.e., by creating ports associated with the logical network's identifier) to only the host machines on which VMs connected to the logical network are operating, the network managers instead create these ports on all hosts, whether or not a VM will attach to any of the ports on a given host. On the other hand, some embodiments allow the user to specify only a specific sets of hosts (e.g., machines not shared with other logical networks) on which the logical network can be present.

II. Logical Network Communication

The above section describes the creation of a logical network spanning multiple domains within a hosting system. This enables VMs located within a single host, within different hosts within a single domain, or within different domains to communicate with each other (i.e., by sending and receiving traffic packets from each other). The following section describes the transmission of such packets from a first VM in a first domain to a second VM in a second, different domain.

Figure 7:
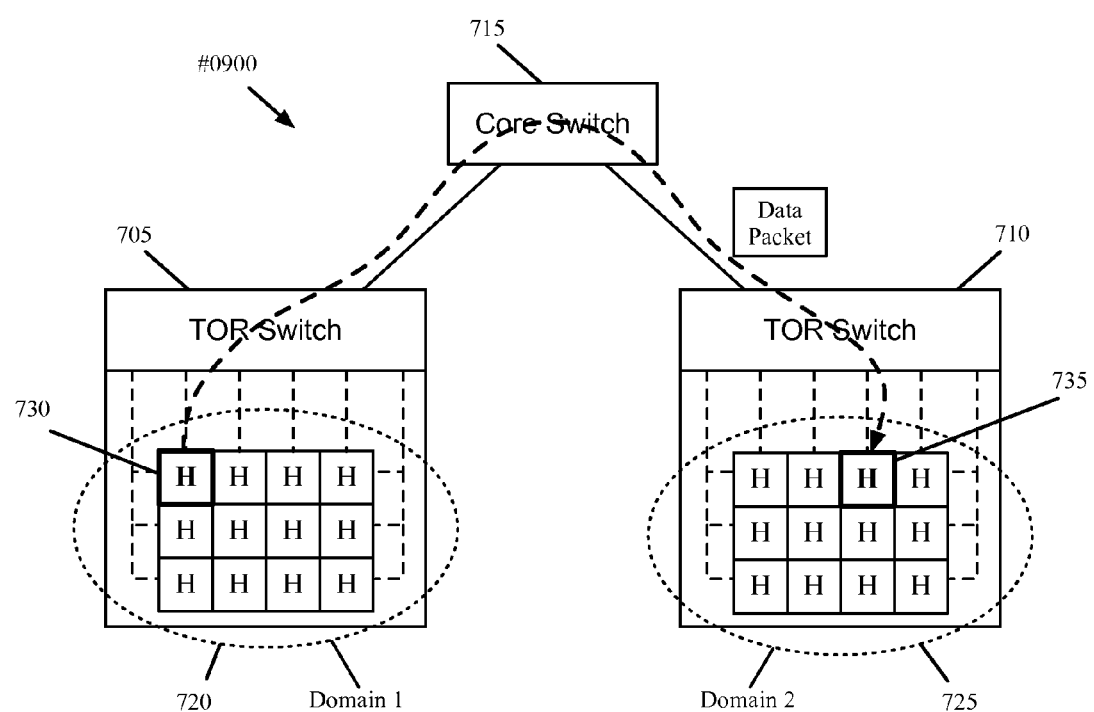
FIG. 7 conceptually illustrates the switching architecture within a multi-domain hosting system of some embodiments.

FIG. 7 conceptually illustrates the switching architecture 700 within a multi-domain hosting system of some embodiments. Whereas previous figures (e.g., FIG. 1) illustrated the hosts along with various components of the network management system, this figure illustrates hosts along with various components of the switching architecture. In this case, the switching architecture 700 includes (i) distributed virtual switches located in the host machines, (ii) top-of-rack (TOR) switches 705 and 710, each connected to a rack of hosts, and (iii) a core switch 715 located between the two TOR switches. While these switching elements are shown as switches, in various embodiments they may perform L2 switching, L3 routing, etc. In this case, each of the sets of hosts that connect to one of the TOR switches 705 and 710 is a single domain managed by a single local domain manager (e.g., domain 120 or domain 125). That is, the set of hosts that connect to TOR switch 705 is a first domain 720 and the set of hosts that connect to TOR switch 710 is a second domain 725. However, in some embodiments, the TOR switches do not necessarily align with a single domain. Multiple domains of hosts can connect to a single TOR switch and/or a single domain of hosts could connect to multiple TOR switches.

In the example of FIG. 7, a VM on a first host 730 in the first domain 720 and a VM on a second host 735 in the second domain 725 are connected to the same logical network. That is, both of these hosts have sets of ports associated with the same logical network identifier so that the VMs connected to the ports can send traffic to and from each other. As shown, a data packet sent from the first VM located on the first host 730 to the second VM on the second host 735 travels from the host (i.e., the distributed virtual switch in the host) to that hosts TOR switch 705, then to the core switch 715 that interconnects the various TOR switches, then to the TOR switch 710, and finally down to the host 735.

Figure 8:
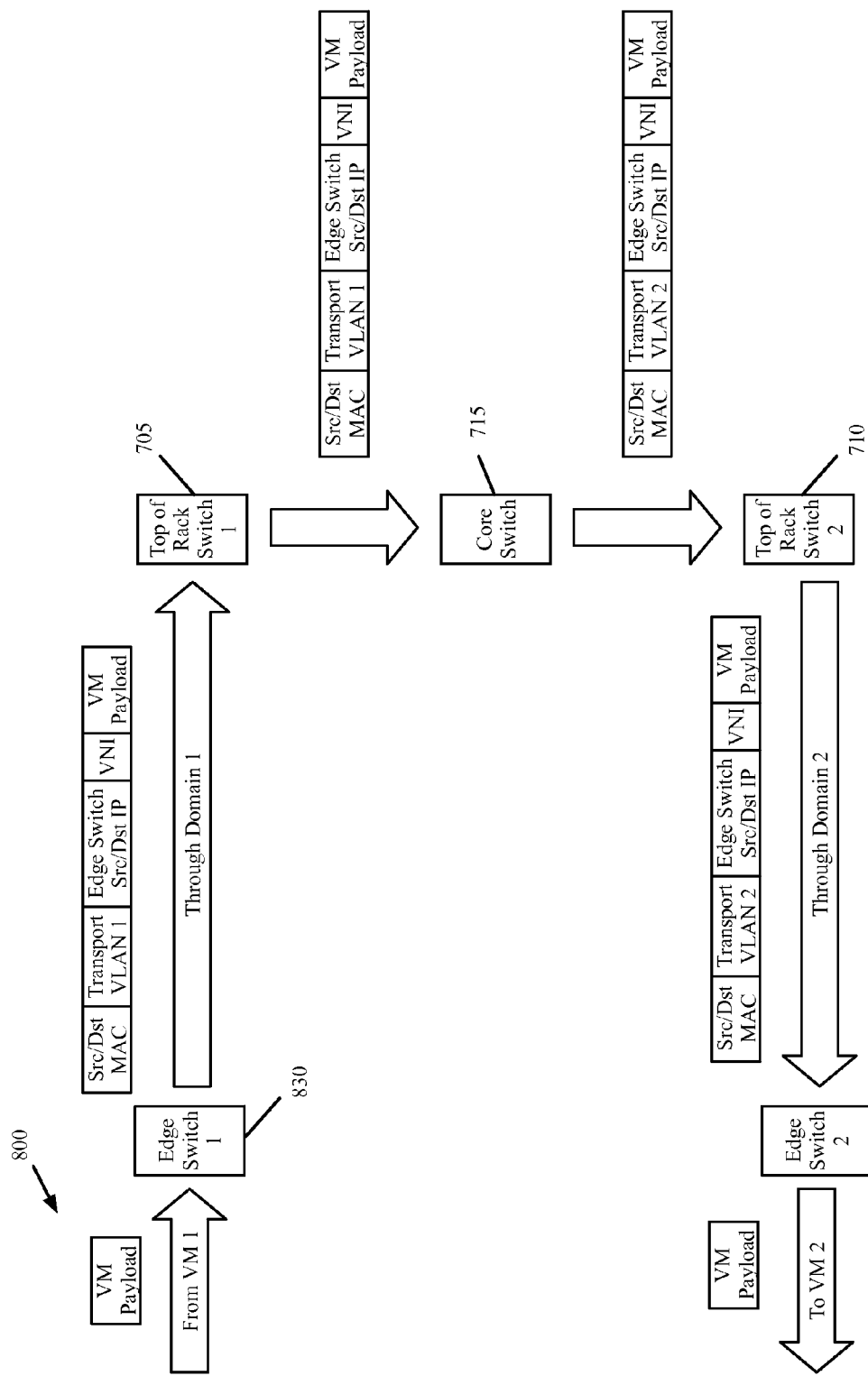
FIG. 8 conceptually illustrates the transmission of a packet between various entities within the switching architecture of FIG. 7 according to some embodiments.

In some embodiments, the connection between the hosts is enabled by a tunnel that uses the logical network identifier as well as source and destination information for the hosts (e.g., the switches on the hosts). This tunnel is between the distributed virtual switches on the two hosts, rather than the VMs, and therefore the VMs are not aware of the logical network identifier. FIG. 8 conceptually illustrates the transmission of a packet between various entities within the switching architecture 700 according to some embodiments.

As shown, the packet 800 is sent from the first VM to the edge switch 830 located on the host 730 with the VM. At this point, the packet only includes the VM payload. This VM payload represents the original packet (e.g., Ethernet frame) sent by the VM, which may include a payload (e.g., data, an ARP request, etc.), the MAC addresses of the source and destination VMs, etc. One of ordinary skill in the art will recognize that at this stage, as well as the other stages shown in this figure, the packet will include additional information (e.g., various header flags, etc.). However, the illustration and description of these packets have been simplified for clarity.

The packet arrives at a specific port of the edge switch 830 (e.g., a distributed virtual switch) to which the source VM connects. This port is associated with a particular logical network having a particular logical network identifier. As shown, the edge switch 830 encapsulates the packet using (i) the logical network identifier (VNI), and (ii) the source and destination IP addresses of itself and the terminating edge switch ports. These IP addresses serve as the endpoints of the tunnel between the ports of the two edge switches. While the edge switch 830 will always know its own source IP address, in some cases IP multicast is used in order to learn the mappings between VM source addresses and tunnel port IP addresses. The example of a packet shown in FIG. 8 assumes that this mapping has already been learned by the edge switches 830 and 835.

In some embodiments, the logical network identifier is a 24 bit identifier, which enables over 16 million different logical networks to be sent over a single switching fabric. The logical network identifiers of some embodiments are agnostic to the physical switching fabric, and therefore can be used without having to modify the physical fabric. Furthermore, because the entire L2 frame (sent from the VM) is encapsulated, the use of such logical networks enables the L2 packets to be sent across L3 networks.

In addition to the tunnel encapsulation with the logical network and the IP addresses, some embodiments add a transport VLAN tag at the edge switch, as well as the source and destination switch MAC addresses. This transport VLAN tag is used for forwarding the packet within the local domain. In some embodiments, the local domain manager programs the distributed virtual switches in its domain to use a transport VLAN tag for all packets encapsulated with logical network information for transport within the domain. Each of the domains in some embodiments is a L2 domain, which are linked together by a L3 network. The source and destination switch MAC addresses, in some embodiments, are those of the edge switches. These also remain constant while the packet traverses the network.

The TOR switch 705 does not modify the packet, and forwards it to the core switch 715. The core switch 715, recognizing that the packet should be forwarded to the second domain 725 (based on the destination IP address of the edge switch 735) removes the first transport VLAN tag and replaces this with a second transport VLAN tag used for transmitting packets through the second domain. The TOR switch 710 in the second domain identifies the correct edge switch 735 based on the destination IP address and sends the packet to the host at which the edge switch 735 is located. At this point, the edge switch 735 removes the tunnel encapsulation (i.e., the source and destination IP addresses and the logical network identifier) and sends the original L2 packet to the correct VM through the correct port. While the packet is shown as not being modified by the top of rack switches, and only having the transport VLAN modified by the core switch, in some embodiments these switches perform modifications not shown in this diagram (e.g., adding and removing next-hop addresses).

III. Management of Ongoing Networks

Section I above describes the creation of logical networks by the network management system to some embodiments. Once networks are created, the network management system performs various operations to maintain the network. These operations include status polling, addition and removal of VMs from the logical network, addition and removal of domains from the span of the logical network, and removal of the logical network entirely.

A. Status Polling

In the hierarchical network management system of some embodiments, determining the status of the VMs in a logical network and collecting statistics for the VMs and hosts is a multi-layer process. The second level manager sends a command through the local domain managers' APIs to request status information for a particular logical network. Each of the local domain managers then sends this request to each of the hosts in its domain on which a VM in the logical network is located. The local domain manager receives back this status information and aggregates the statistics for its domain, then returns these aggregated statistics to the second level manager. The second level manager performs a second level of aggregation on the stats in order to analyze the statistics as a whole.

Figure 9:
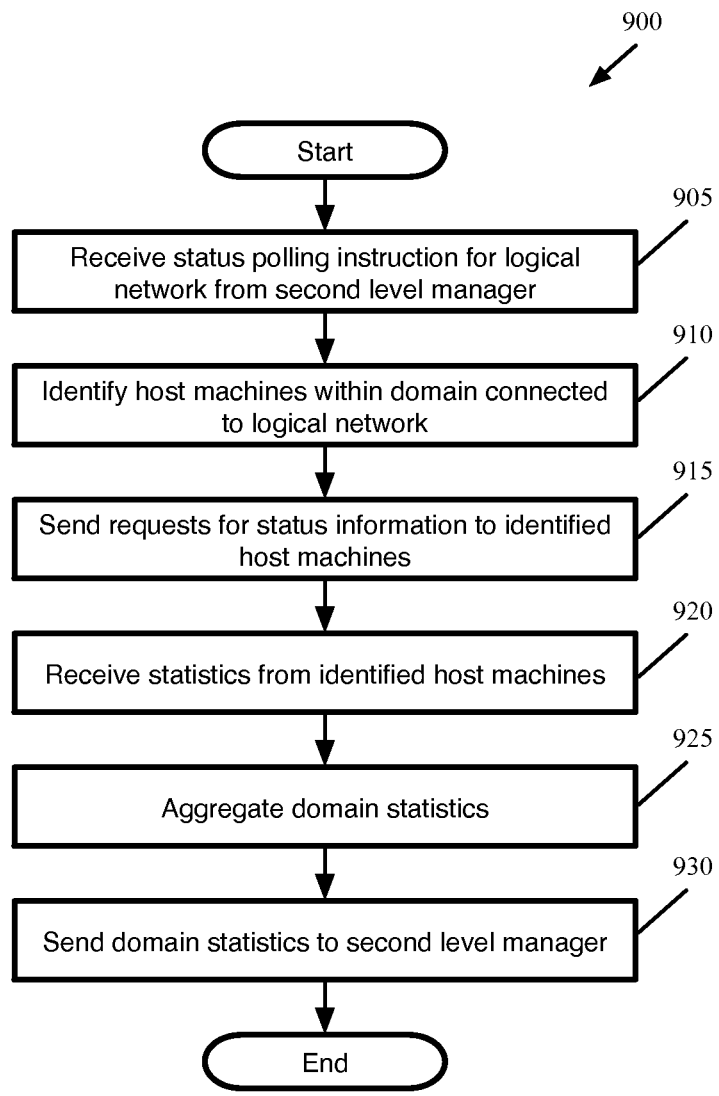
FIG. 9 conceptually illustrates a process performed by the local domain managers of some embodiments for performing status polling in a hierarchical network management system.

FIG. 9 conceptually illustrates a process 900 performed by the local domain managers of some embodiments for performing this status polling in a hierarchical network management system. The process 900 will be described by reference to FIG. 10, which illustrates such hierarchical status polling over three stages 1010-1030 of the network management system 500 from FIG. 5.

Figure 10:
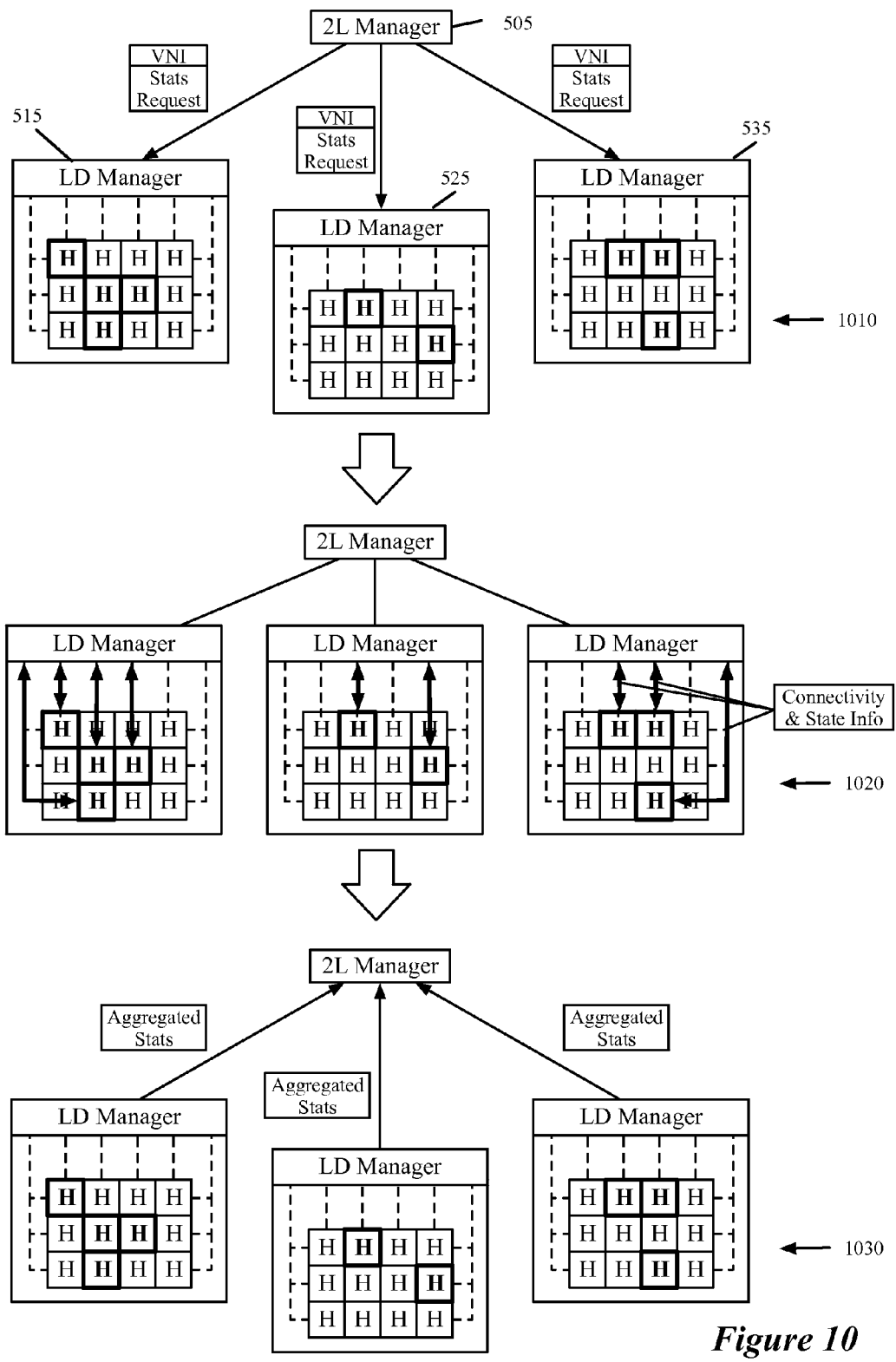
FIG. 10 illustrates hierarchical status polling within a network management system.

The process 900 begins by receiving (at 905) a status polling instruction for a logical network from a second level manager. In some embodiments, the local domain manager receives this instruction as an API command over a communications channel with the second level manager. The first stage 1010 of FIG. 10 illustrates the second level manager 505 sending a statistics request (i.e., a status polling request) along with a logical network identifier to each of the local domain managers 515-535. In some embodiments, the second level manager sends out such requests for each of the logical networks it manages at regular intervals (e.g., once an hour, every twelve hours, once a day, etc.). As the second level manager may manage hundreds, thousands, or more logical networks, it may regularly be performing status polling or analysis of status polling results, in addition to the logical network creation and updating processes.

The second level manager stores information for each logical network that indicates the domains in which the logical network has been created (i.e., the span of the logical network). Thus, the second level manager of some embodiments only sends the status polling requests for a particular logical network to those domains in which the logical network has been create, rather than sending out generic status requests to all local domain managers. In the case of FIG. 10, the logical network is present in all three of the domains shown, and therefore the status request is sent to all three of the local domain managers 515-535.

Returning to FIG. 9, the process 900 next identifies (at 910) host machines within the local domain that are connected to the logical network. Each local domain manager, in some embodiments, stores a table, database, or other data structure that indicates each logical network present within its domain and the hosts on which each of those logical networks is present. Accordingly, the local domain manager maps the logical network identifier received in the status request to a set of hosts.

The process then sends (at 915) requests for status information to the identified host machines. Different embodiments communicate these requests to the host machines differently. Some embodiments communicate with the distributed virtual switch on the host in order to collect information about the logical network. Other embodiments, either in addition or as an alternative, communicate with a virtual machine monitor or hypervisor on the node to get information about the virtual machine that is connected to the logical network.

In response, the process 900 receives (at 920) statistics from the identified host machines to which the local domain manager sent the requests. The second stage 1020 of FIG. 10 illustrates the local domain managers contacting the hosts on which the particular logical network is active and receiving connectivity and state information from these hosts in return. In some embodiments, the state information returned by the host machine (e.g., by the distributed virtual switch) includes the VMs on the host that are actually using the logical network, statistics of a particular virtual machine, etc. The connectivity information indicates the logical connectivity of the logical network on the particular host (e.g., does the distributed virtual switch in the host still maintain the ports associated with the logical network).

The process 900 aggregates (at 925) the received statistics for the domain. In some embodiments, the aggregation involves performing various calculations (e.g., summations of statistics). The aggregation may also involve providing a single view of the logical network within the domain. For instance, this may include the number of total virtual machines connected to the logical network within the domain, the number of hosts on which the logical network is active, the level of activity on the various hosts, etc.

Finally, the process 900 at the local domain manager sends (at 930) the aggregated domain statistics to the second level manager that sent the request. The third stage 1030 of FIG. 10 illustrates that the local domain managers 515-535 have aggregated the local status information and are sending this aggregated information to the second level manager 505. In some embodiments, different nodes in the second level manager cluster communicate with different local domain managers, and thus the local domain manager sends its aggregated statistics to the particular node that sent the initial status polling request.

Upon receiving the aggregated statistics, the second level manager performs a second level of aggregation on the statistics in order to analyze the statistics as a whole. If different second level manager nodes receive statistics from different local domain managers, then the information must first be shared (e.g., through the replicated databases described above) in order for the aggregate view of the network to be generated.

A user of the second level manager (e.g., a system administrator) may want to see the aggregated information for each of the different domains (e.g., to see whether more VMs should be moved into a domain, whether a domain should be removed from the span of the logical network, etc.). In addition, the user may wish to see statistics for the entire network (e.g., the number of hosts on which the network is implemented, the number of VMs per host, etc.). In some embodiments, this information may be provided graphically to the user through an interface of the second level manager.

B. Logical Network Updates

The user (e.g., system administrator) may request various types of updates to a logical network. For instance, a logical network may have VMs added or removed, hosts added or removed, and logical domains added or removed from its span. In addition, in some embodiments, the connectivity policies could be modified (e.g., changing various network rules, assigning a new logical network identifier, etc.). The following FIGS. 11-14 conceptually illustrate some of these different types of logical network updates.

Figure 11:
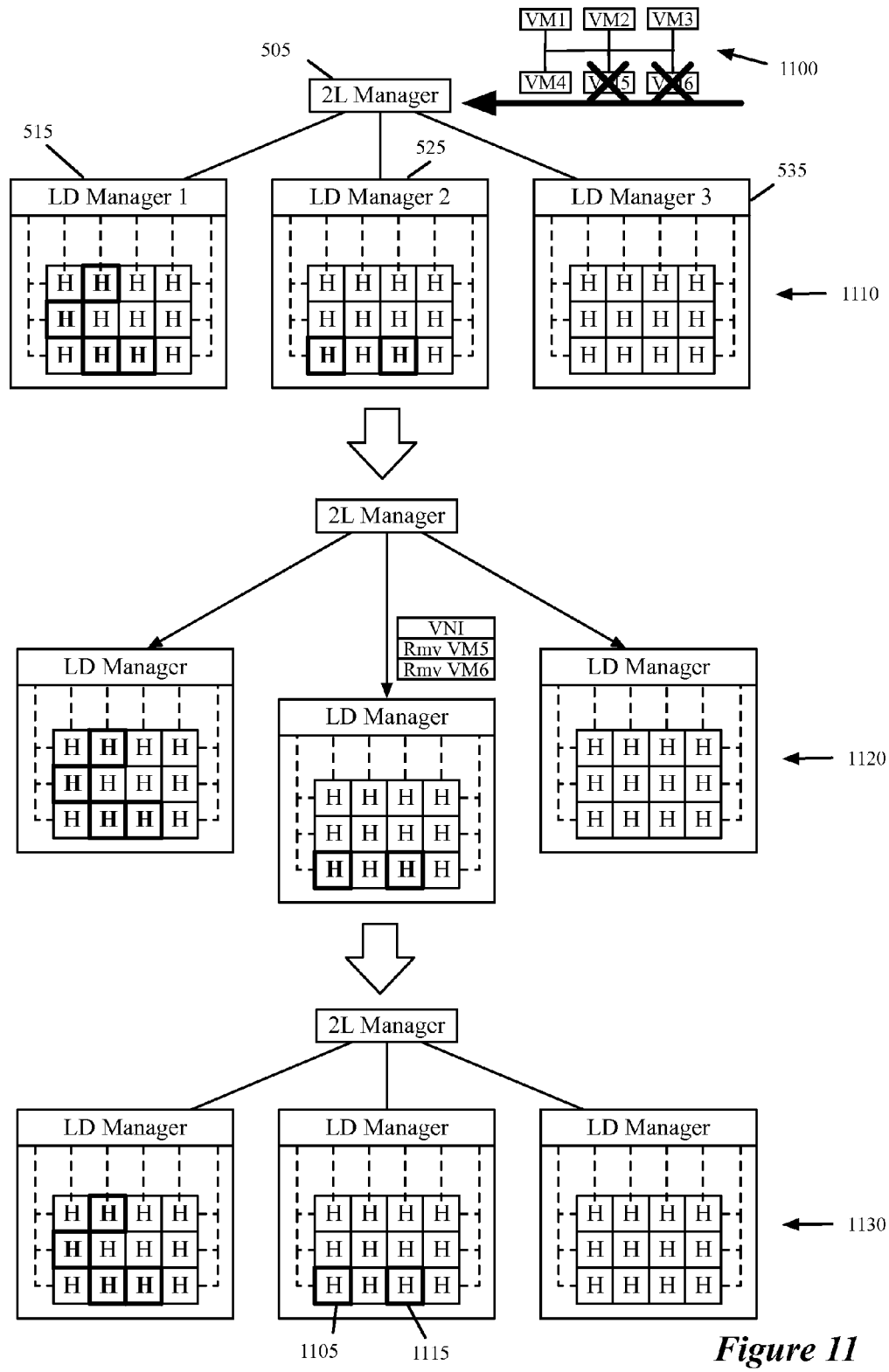
FIG. 11 illustrates the removal of VMs from a logical network.

FIG. 11 illustrates the removal of VMs from a logical network 1100 over three stages 1110-1130. While this example again illustrates the second level manager 505 and the local domain managers 515-535, a different logical network is illustrated than in FIGS. 5 and 10. In this case, the logical network 1100 has six VMs connected (on six different hosts) and spans two domains (those of local domain managers 515 and 525).

The first stage 1110 illustrates the second level manager 505 receiving a command to remove two VMs from the logical network. In some embodiments, the command is received by one of the second level manager nodes through a user interface of the node (e.g., through a graphical interface, a command-line interface, etc.). The user might want to decrease the size of the network, take specific VMs offline, move the VMs to a different logical network, etc.

The second level manager then identifies the domain in which the VMs specified for removal are located. In this case, both of the removed VMs are located in the second domain managed by the local domain manager 535. As such, in the second stage 1120, the second level manager sends a command to the local domain manager 535 to remove the specified VM5 and VM6 from the logical network 1100. In some embodiments, this command is sent through an API of the local domain manager exposed to the second level manager, as with the logical network and/or status polling commands. The second level manager may send a separate command for each VM or a single command with all of the VMs specified, depending on the format available through the API.

Figure 13:
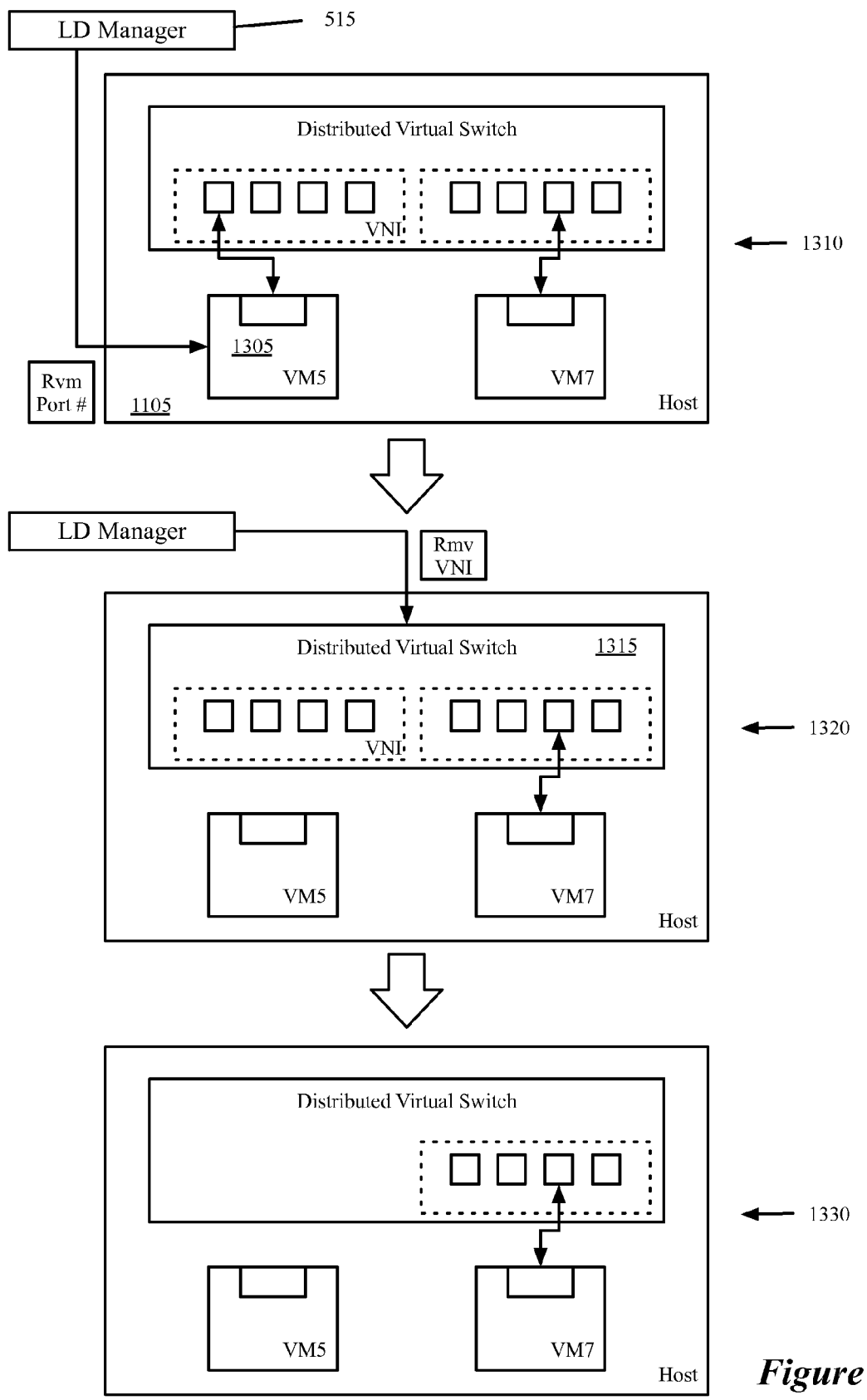
FIG. 13 illustrates a detailed view of a host machine at which a VM is detached from a logical network and the logical network is removed.

The third stage 1130 illustrates that the local domain manager 525 then removes the connection of the specified VMs to the ports on their respective hosts associated with the particular logical network. In some embodiments, the local domain manager leaves the set of ports associated with the logical network identifier for the logical network still active on the distributed virtual switch of the host. Thus, if the user decides to add a new machine to the network, the machine can be created on the host machine without having to re-create the ports. Furthermore, having the ports already set up makes VM migration easier; a VM from a first host machine that is connected to the logical network can be migrated to the second host machine that already has the logical network ports set up. In the third stage 1130, the host machines 1105 and 1115 with logical ports but no attached VMs are shown with thick lines but the "H" not bolded. FIG. 13, described below, illustrates the disconnection of a VM from a port within a host.

Figure 12:
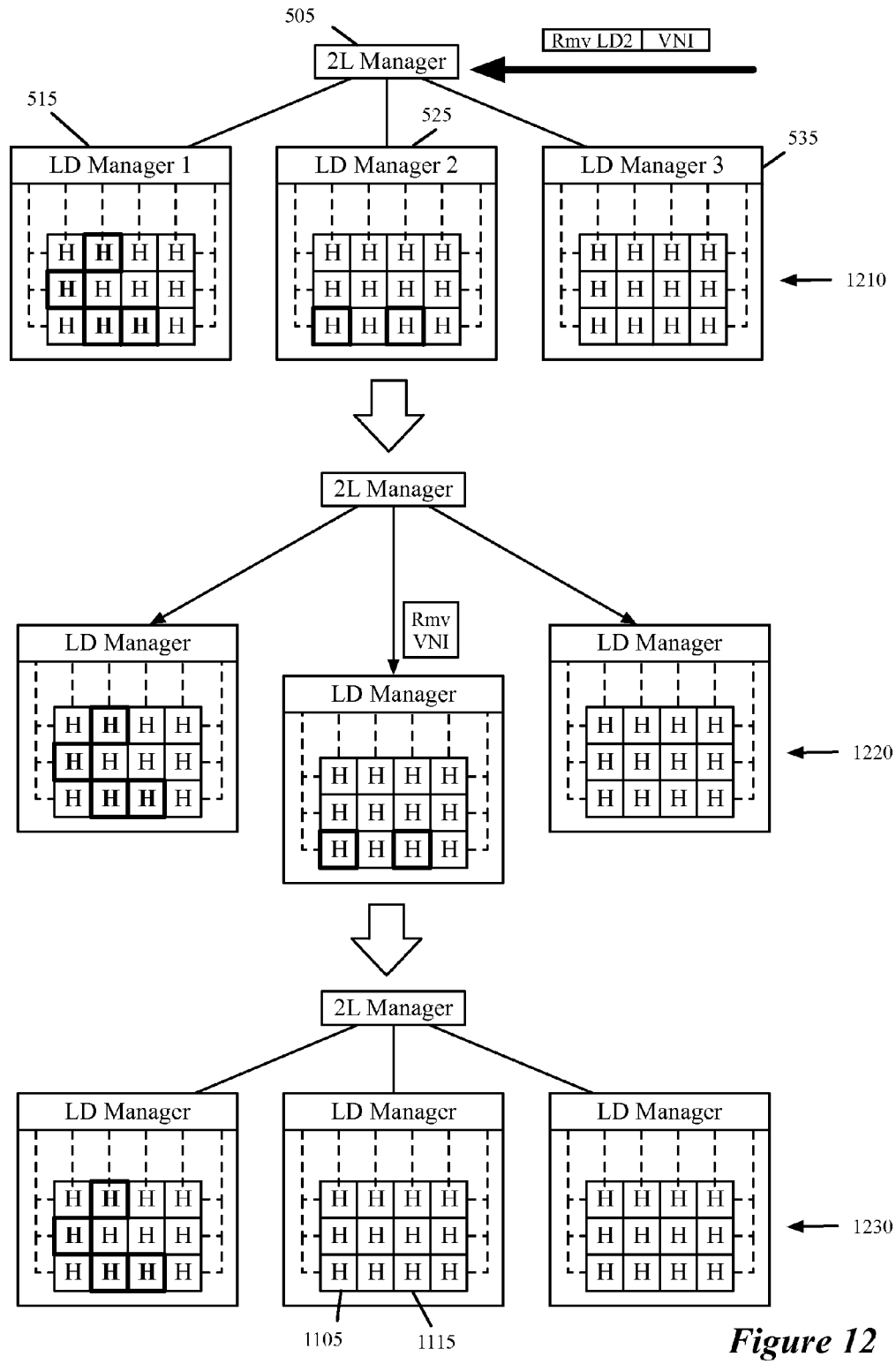
FIG. 12 illustrates the removal of a logical network from a domain.

In addition to removing VMs from a logical network, in some cases a user may wish to remove an entire domain from the span of the logical network. For various reasons, in some embodiments users may want their logical network to only run on a certain number of domains, or only on specific domains. FIG. 12 illustrates the removal of a logical network from a domain over three stages 1210-1230. This example continues from the previous FIG. 11, showing the implementation of logical network 1100 in a network managed by second level manager 505 and local domain managers 515-535.

In the first stage 1210, the second level manager 505 receives a command to remove the second domain of the physical network from the span of the logical network 1100. In some embodiments, the command is received by one of the second level manager nodes through a user interface of the node (e.g., through a graphical interface, a command-line interface, etc.). While the logical network is shown in the figure as being identified by its logical network identifier (VNI), in some embodiments the user makes this decision via a graphical representation of the network, which is translated into the logical network identifier at the second level manager.

The second level manager then sends a command to the local domain manager of the specified domain instructing the local domain manager to execute the removal of the logical network from the host machines within its domain. As shown in the second stage 1220, the second level manager 505 sends this command through the API of the local domain manager, identifying the logical network via its network identifier.

The third stage 1230 illustrates that the logical network is no longer present on the host machines 1105 and 1115, indicated in the figure by the removal of the thicker lines for these hosts. In some embodiments, removal of the logical network from a host machine entails removing all of the ports associated with that logical network from the distributed virtual switch on the host machine, as described below for FIG. 13.

In this case, the domain from which the logical network was removed did not host any virtual machines connected to the logical network at the time the command was received. Different embodiments respond differently when receiving a request to remove a logical network from a domain in which VMs are currently connected to the logical network. Some embodiments automatically detach the VMs in the domain from the logical network, then remove the logical network ports from the host machines. Other embodiments, however, respond with a failure command to the second level manager, indicating that the user must first affirmatively remove the VMs located in that domain from the logical network before removing the logical network from the domain. Some embodiments provide a list of such VMs to the second level manager as well.

FIG. 13 illustrates a more detailed view of the host machine 1105 over the course of three stages 1310-1330, which parallel the FIGS. 11 and 12. As described above, in FIG. 11 a VM in host 1105 is detached from the logical network 1100, while in FIG. 12 the logical network is removed from the host 1105. The first stage 1310 illustrates that the local domain manager 515 sends a command to the virtual machine 1305 to remove its connection to a particular port number within the distributed virtual switch (i.e., to no longer send packets to that port). This command, in various embodiments, may be sent to the VM through a hypervisor, virtual machine monitor, or other application running on the host to enable communication with the VM. The local domain manager 515 of some embodiments stores information regarding all of the VMs within its domain, including the ports to which the VMs connect, and therefore has the necessary information to send this command upon receiving a command from the second level manager to remove the VM 1305 from its logical network.

The second stage 1320 illustrates that the VM 1305 is no longer connected to the distributed virtual switch 1315. In this situation, the VM is essentially orphaned, with no connection to a network. If no new network is specified for the VM at this point, some embodiments automatically remove the VM from the host in order to free up resources of the host machine. Other embodiments leave the VM for a period of time in case the user of the VM chooses to connect it to a different network (or reconnect it to the previous logical network).

In addition, the second stage 1320 illustrates the local domain manager 515 sending a command to the distributed virtual switch 1315 to remove the logical network 1100, identified by its logical network identifier, from the host machine. The local domain manager 515 performs this action in response to receiving a command from the second level manager as shown in stage 1220 of FIG. 12.

The third stage 1330 illustrates the result of this command. The set of ports associated with the logical network identifier for the specified logical network have now been removed from the distributed virtual switch 1315, although the distributed virtual switch still has the ports for a different logical network to which a different VM on the host connects.

Figure 14:
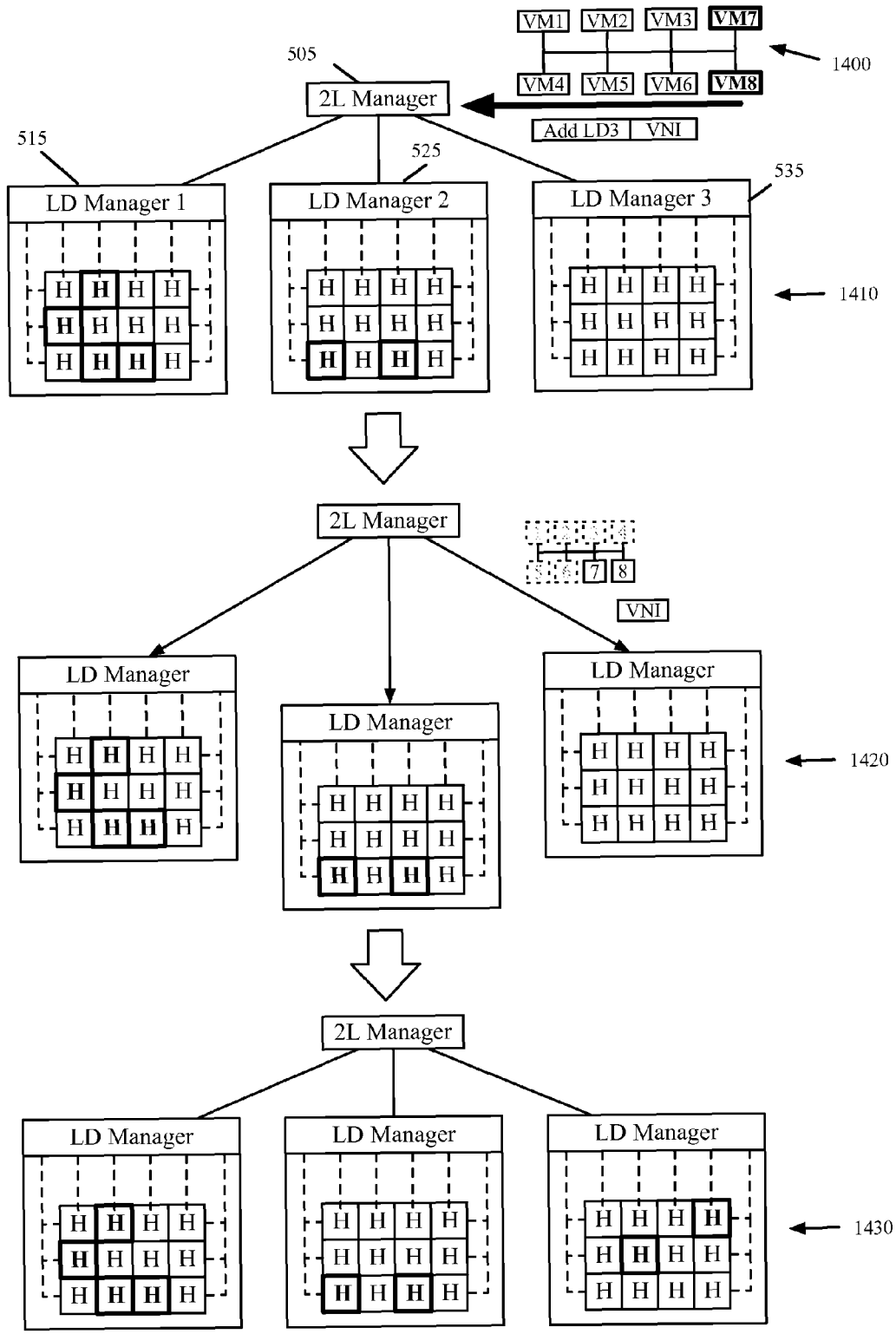
FIG. 14 conceptually illustrates an example of adding VMs to a logical network and adding a domain to the span of the logical network.

The above examples illustrate updates that shrink the logical network, either in terms of the number of virtual machines connected to the network or the number of domains across which the network spans. In addition, users can add to an existing logical network, again both in terms of the number of virtual machines or the number of domains. FIG. 14 conceptually illustrates an example of performing both actions over three stages 1410-1430 for a logical network 1400. This example again illustrates the second level manager 505 and the local domain managers 515-535, in this case managing a logical network 1400 with six VMs connected (on six different hosts) and spanning two domains (those of local domain managers 515 and 525).

The first stage 1410 illustrates the second level manager 505 receiving a command to add two VMs to the logical network 1400, as well as to add a third logical domain to the span of the logical network. In some embodiments, the command is received by one of the second level manager nodes through a user interface of the node (e.g., through a graphical interface, a command-line interface, etc.). In this case, the user might want to increase the failure resistance of the network, increase the amount of computing power available in anticipation of an uptick in traffic, etc. While the logical network is shown in the figure as being identified by its logical network identifier (VNI), in some embodiments the user makes this decision via a graphical representation of the network, which is translated into the logical network identifier at the second level manager.

The second level manager 505 then identifies locations for the two added VMs, which in this case will be in the newly added domain. In different situations, VMs added to a logical network may be created or already exist in a domain that is already part of the span of the logical network. In this case, the VMs either already exist within the third domain or are to be instantiated within the third domain.

As illustrated in the second stage 1420 of FIG. 14, the second level manager 505 then sends a command to the local domain manager 535 to associate the two new VMs with the logical network, identified by the logical network identifier. As in the previous example of FIG. 5, the local domain manager 535 only receives information about the VMs in its particular domain. In addition, no information need be sent to the other domains by the second level manager to update them or their VMs about the addition of either the VMs or the local domain to the logical network. Instead, the other VMs in the logical network can learn about the new VMs via standard learning processes.

In the third stage 1430, the local domain manager 535 has set up the logical network on two hosts within its domain, connecting a VM in each of the hosts to a distributed virtual switch in the host. FIG. 6, described above, illustrates the two-stage process of first adding ports to the distributed virtual switch in the host that are associated with the logical network and then connecting a VM in the host machine to one of the newly added ports.

C. Deleting a Logical Network

Figure 15:
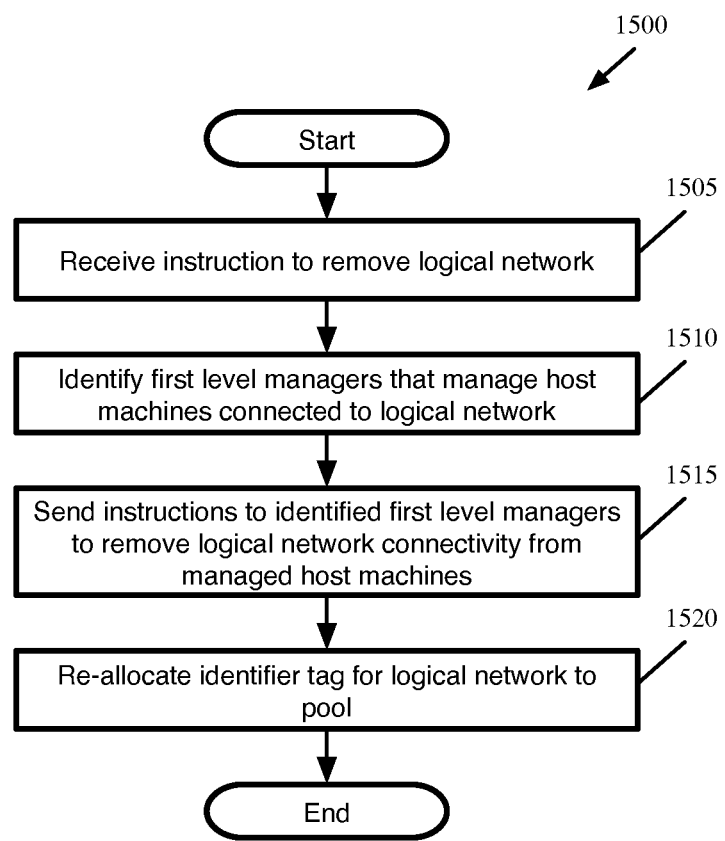
FIG. 15 conceptually illustrates a process performed by a second level manager to remove a logical network from all domains.

In addition to various updates to a logical network (adding or removing VMs, adding or removing domains from the span of the network, etc.), in some cases the administrator of a logical network may wish to remove the network entirely. FIG. 15 conceptually illustrates a process 1500 performed by the second level manager to remove a logical network from all domains.

As shown, the process begins by receiving (at 1505) an instruction to remove the logical network. Like other instructions described above, in some embodiments the second level manager receives this instruction from a user (e.g., a network administrator) through a user interface. For instance, the user might send a command line instruction to remove the logical network or select an option in a graphical user interface.

Next, the process identifies (at 1510) the first level managers that manage domains with host machines connected to the logical network. In some embodiments, the second level manager stores the span of the logical network in its database and therefore this information is easily available.

The process then sends (at 1515) instructions to the identified first level managers to remove the logical network connectivity from the host machines within their domains. In some embodiments, this command is the same as that shown in FIG. 12, but sent to each of the local domain managers for domains in which the logical network is present. The local domain managers then remove the attachments of VMs within their domains to the logical network, if any such attachments exist, by instructing the VM to no longer send packets to the port associated with the logical network. Furthermore, the local domain managers instruct the distributed virtual switches within their domain to remove any ports associated with the logical network. Examples of these actions by the local domain manager are illustrated in FIG. 13, described above.

Finally, with the logical network removed from the entire managed network, the process re-allocates (at 1520) the identifier for the logical network back to its pool of such identifiers. As described above by reference to FIG. 3, in some embodiments the second level manager stores a pool of available logical network identifiers. Once a logical network has been removed, its identifier becomes available for use by a new logical network.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 16:
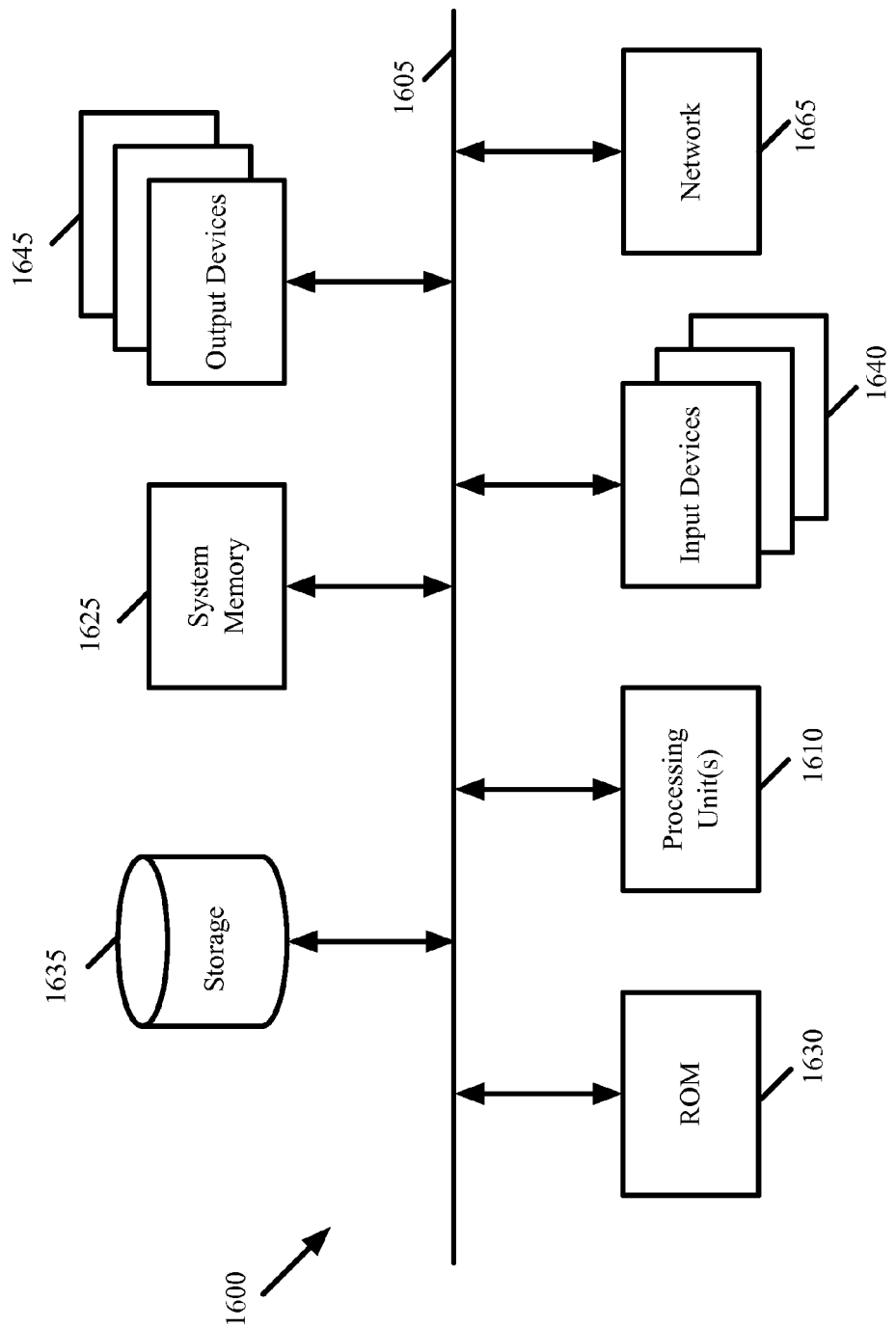
FIG. 16 conceptually illustrates an electronic system with which some embodiments of the invention are implemented.

FIG. 16 conceptually illustrates an electronic system 1600 with which some embodiments of the invention are implemented. The electronic system 1600 can be used to execute any of the control, virtualization, or operating system applications described above. The electronic system 1600 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1600 includes a bus 1605, processing unit(s) 1610, a system memory 1625, a read-only memory 1630, a permanent storage device 1635, input devices 1640, and output devices 1645.

The bus 1605 collectively represents all system, peripheral, and chipset buses that communicatively connect the numerous internal devices of the electronic system 1600. For instance, the bus 1605 communicatively connects the processing unit(s) 1610 with the read-only memory 1630, the system memory 1625, and the permanent storage device 1635.

From these various memory units, the processing unit(s) 1610 retrieve instructions to execute and data to process in order to execute the processes of the invention. The processing unit(s) may be a single processor or a multi-core processor in different embodiments.

The read-only-memory (ROM) 1630 stores static data and instructions that are needed by the processing unit(s) 1610 and other modules of the electronic system. The permanent storage device 1635, on the other hand, is a read-and-write memory device. This device is a non-volatile memory unit that stores instructions and data even when the electronic system 1600 is off. Some embodiments of the invention use a mass-storage device (such as a magnetic or optical disk and its corresponding disk drive) as the permanent storage device 1635.

Other embodiments use a removable storage device (such as a floppy disk, flash drive, etc.) as the permanent storage device. Like the permanent storage device 1635, the system memory 1625 is a read-and-write memory device. However, unlike storage device 1635, the system memory is a volatile read-and-write memory, such a random access memory. The system memory stores some of the instructions and data that the processor needs at runtime. In some embodiments, the invention's processes are stored in the system memory 1625, the permanent storage device 1635, and/or the read-only memory 1630. From these various memory units, the processing unit(s) 1610 retrieve instructions to execute and data to process in order to execute the processes of some embodiments.

The bus 1605 also connects to the input and output devices 1640 and 1645. The input devices enable the user to communicate information and select commands to the electronic system. The input devices 1640 include alphanumeric keyboards and pointing devices (also called "cursor control devices"). The output devices 1645 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 16, bus 1605 also couples electronic system 1600 to a network 1665 through a network adapter (not shown). In this manner, the computer can be a part of a network of computers (such as a local area network ("LAN"), a wide area network ("WAN"), or an Intranet, or a network of networks, such as the Internet. Any or all components of electronic system 1600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 4, 9, and 15) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A network system comprising:
    a plurality of host machines, each comprising a non-transitory machine readable medium, for hosting virtual machines, the host machines divided into a plurality of different domains;
    a plurality of local domain management servers for the plurality of domains, wherein each local domain management server of each domain is for (i) initiating creation of at least one set of distributed virtual switch ports associated with at least one particular logical network identifier on a set of host machines within its domain and (ii) attaching a set of virtual machines on the set of host machines to a created port associated with the particular logical network identifier in order for the virtual machines to send traffic through their respective logical networks; and
    a second level management server for (i) receiving a specification for a logical network, the specification comprising a plurality of virtual machines to connect to the logical network and a set of at least first and second domains in which the virtual machines are located and (ii) coordinating the use of logical network identifiers between multiple different local domain management servers by selecting a logical network identifier for the logical network and providing the selected logical network identifier to at least first and second local domain management servers with data indicating on which host machines in the respective domains to initiate creation of distributed virtual switch ports in order to allow the logical network to span across at least the first and second local domains so that a first virtual machine in the first local domain communicates via the logical network with a second virtual machine in the second domain.

2. The network system of claim 1, wherein the second level management server operates in a cluster with a plurality of additional second level management servers.

3. The network system of claim 2, wherein the second level management server comprises a database storing logical network information.

4. The network system of claim 3, wherein the database is for replication to databases at the additional second level management servers.

5. The network system of claim 2, wherein the second level management server comprises interfaces to (i) the plurality of local domain management servers and (ii) the additional second level management servers.

6. The network system of claim 1, wherein the second level management server comprises an interface for receiving the specification of the logical network.

7. The network system of claim 6, wherein the specification of the logical network is received from user input.

8. The network system of claim 6, wherein the logical network spans the set of domains in which the virtual machines are located, wherein the interface is further for receiving an update to the specification of the logical network adding a domain to the set of domains across which the logical network spans.

9. The network system of claim 6, wherein the logical network spans the set of domains in which the virtual machines are located, wherein the interface is further for receiving an update to the specification of the logical network removing a particular domain from the set of domains across which the logical network spans.

10. The network system of claim 9, wherein the second level management server is further for sending instructions to the local domain management server for the particular domain to remove distributed virtual switch ports associated with the particular logical network from any hosts within the particular domain.

11. The network system of claim 1, wherein the second level management server is further for requesting status information about the logical network from particular local domain management servers with virtual machines attached to the logical network, receiving status updates from the particular logical domain management servers, and aggregating the status updates in order to manage the logical network.

12. The network system of claim 11, wherein the first local domain management server is for receiving the request for status information about the logical network from the second level management system, sending a request to each of a set of hosts within its domain that host virtual machines attached to the logical network, receiving status information from each of the hosts in the set, aggregating the received status information, and sending the aggregated status information to the second local domain management server.

13. A method for creating a logical network that spans a plurality of domains within a hosting system, the method comprising:
    at a network management server, receiving a specification for a logical network, the specification comprising (i) a plurality of virtual machines to connect to the logical network and (ii) a set of at least two domains in which the virtual machines are located;

from a range of available logical network identifiers stored by the management server, allocating a particular logical network identifier for the specified logical network; and sending instructions to a local domain manager at each of the domains in which the virtual machines are located with data providing the allocated logical network identifier and indicating on which host machines in the respective domains to initiate creation of distributed virtual switch ports associated with the allocated logical network identifier in order for the local domain manager to attach the virtual machines in its domain to the logical network using the allocated logical network identifier so that the logical network spans across at least first and second local domains such that a virtual machine in the first domain communicates with the second virtual machine in a second domain.

14. The method of claim 13 further comprising removing the particular logical network identifier from the range of available logical network identifiers.

15. The method of claim 13 further comprising storing the specification for the logical network and the allocated logical network identifier in a database for replication to a plurality of additional network management servers.

16. The method of claim 13, wherein a particular local domain manager attaches a particular virtual machine to the logical network by communicating with a host on which the particular virtual machine operates to (i) create a set of ports associated with the particular logical network identifier in a distributed virtual switch on the host and (ii) attach the particular virtual machine to one of the created ports.

17. The method of claim 16, wherein when the particular virtual machine is attached to one of the ports, the distributed virtual switch adds the particular logical network identifier to packets sent from the particular virtual machine to the port.

18. A network management server comprising:
a set of processing units; and
a non-transitory machine readable medium storing a program for execution by the set of processors, the program comprising:
  a first interface for receiving a specification for a logical network, the specification comprising (i) a plurality of virtual machines to connect to the logical network and (ii) a set of at least two domains in which the virtual machines are located;
  a second interface for sending instructions to a local domain manager at each of the domains in which the virtual machines are located, the instructions for each local domain manager comprising (i) an allocated logical network identifier and (ii) an identification of a set of host machines in the respective domain on which to initiate creation of distributed virtual switch ports associated with the allocated logical network identifier in order for the local domain manager to attach the virtual machines in its domain to the logical network using the particular logical network identifier allocated to the logical network by the network management server in order to allow the logical network to span across at least first and second local domains such that a first virtual machine in the first domain communicates with a second virtual machine in the second domain; and
  a third interface for replicating information about the logical network to additional network management servers.

19. The network management server of claim 18, wherein the machine readable medium further stores a database for storing the information about the logical network to be replicated to the additional network management servers.

20. The network management server of claim 18, wherein the program further comprises a set of instructions for storing a plurality of logical network identifiers for allocation to different logical networks.

* * * * *